US012621508B2

(12) United States Patent
El-Rahman et al.

(10) Patent No.: US 12,621,508 B2
(45) Date of Patent: May 5, 2026

(54) METHODS, SYSTEMS, AND MEDIA FOR STREAMING MEDIA CONTENT ITEMS CONTAINING ADVERTISING CONTENT

(71) Applicant: Integral Ad Science, Inc., New York, NY (US)

(72) Inventors: Nabhan El-Rahman, Cupertino, CA (US); Kevin Paek, Aiea, HI (US); James Verner Wilhite, Camarillo, CA (US); Maxim Levkov, Los Angeles, CA (US); Akshita Gandra, New York, NY (US); Ming Jing Qian, Moraga, CA (US)

(73) Assignee: Integral Ad Science, Inc., New York, NY (US)

( * ) Notice: Subject to any disclaimer, the term of this patent is extended or adjusted under 35 U.S.C. 154(b) by 0 days.

(21) Appl. No.: 18/673,651

(22) Filed: May 24, 2024

(65) Prior Publication Data

US 2025/0142140 A1     May 1, 2025

Related U.S. Application Data

(60) Provisional application No. 63/553,879, filed on Feb. 15, 2024, provisional application No. 63/468,993, filed on May 25, 2023.

(51) Int. Cl.
*H04N 21/234*        (2011.01)
*H04N 21/266*        (2011.01)
*H04N 21/81*         (2011.01)

(52) U.S. Cl.
CPC ..... *H04N 21/23424* (2013.01); *H04N 21/266* (2013.01); *H04N 21/812* (2013.01)

(58) Field of Classification Search
CPC ....... H04N 21/41422; H04N 21/42202; H04N 21/4532; H04N 21/4788; H04N 21/4302;
(Continued)

(56) References Cited

U.S. PATENT DOCUMENTS

2002/0026638 A1 *   2/2002   Eldering ............ H04N 21/6125
                                                   348/E7.063
2003/0058707 A1 *   3/2003   Dilger ................ H04N 21/8543
                                                   348/E7.06
(Continued)

OTHER PUBLICATIONS

Halpert, Scott, "Understanding and Solving Monetization Problems for SSAI/DAI in VOD", In Penthera Video Insights, Penthera, Q3 2022, pp. 1-12.

*Primary Examiner* — Timothy R Newlin
(74) *Attorney, Agent, or Firm* — Byrne Poh LLP

(57)        ABSTRACT

Methods, systems, and media for streaming a media content item containing advertising content are provided. In some embodiments, the method comprises: identifying, in a manifest file at a server used to stream media content items, an indication that an advertising content item is to be played back at a first playback position for a first duration when streaming a media content item; determining a retrieval time to retrieve the advertising content item from an advertising source for an advertisement break; inserting, into the manifest file at the server used to stream media content items, a retrieval indication that the advertising content item is to be retrieved from the advertising source at a second playback time; retrieving the advertising content item from the advertising source when streaming of the media content item has reached the second playback position; determining a remaining amount of time corresponding to an unfilled portion of the advertisement break based on a duration of the advertising content item; based on the remaining amount of time corresponding to the unfilled portion of the advertising break, retrieving at least one additional advertisement content item for insertion in the unfilled portion of the advertising break, where the at least one additional advertisement content item is selected from a plurality of processed advertising content items received from a plurality of network
(Continued)

500 sources, where each of the plurality of network sources has uploaded and assigned at least a first advertising content item having a first duration and at least a second advertising content item having a second duration, and where the first duration associated with the first advertising content item is determined to be within a first range and the second duration associated with the second advertising content item is determined to be within a second range; and collapsing the remaining portion of the advertising break to the end of the at least one additional advertising content item that was retrieved.

19 Claims, 6 Drawing Sheets

(58) Field of Classification Search
CPC ............. H04N 21/4524; H04N 21/436; G06Q 30/0265; G06Q 50/01; G06Q 50/40
See application file for complete search history.

(56) References Cited

U.S. PATENT DOCUMENTS

| | | | |
|---|---|---|---|
| 2003/0070167 A1* | 4/2003 | Holtz ................... | G06F 16/958 |
| | | | 705/14.69 |
| 2003/0177497 A1* | 9/2003 | Macrae ............. | H04N 7/17309 |
| | | | 725/112 |
| 2003/0182658 A1* | 9/2003 | Alexander .......... | H04N 21/858 |
| | | | 725/60 |
| 2006/0287915 A1* | 12/2006 | Boulet .............. | G06Q 30/0269 |
| | | | 348/E7.071 |
| 2013/0077699 A1* | 3/2013 | Gifford ............... | G11B 27/105 |
| | | | 375/240.28 |
| 2017/0251242 A1* | 8/2017 | Wang ................. | H04N 21/4532 |
| 2022/0408139 A1* | 12/2022 | Sweet ............. | H04N 21/43079 |
| 2023/0069253 A1 | 3/2023 | Pressnell et al. | |

* cited by examiner

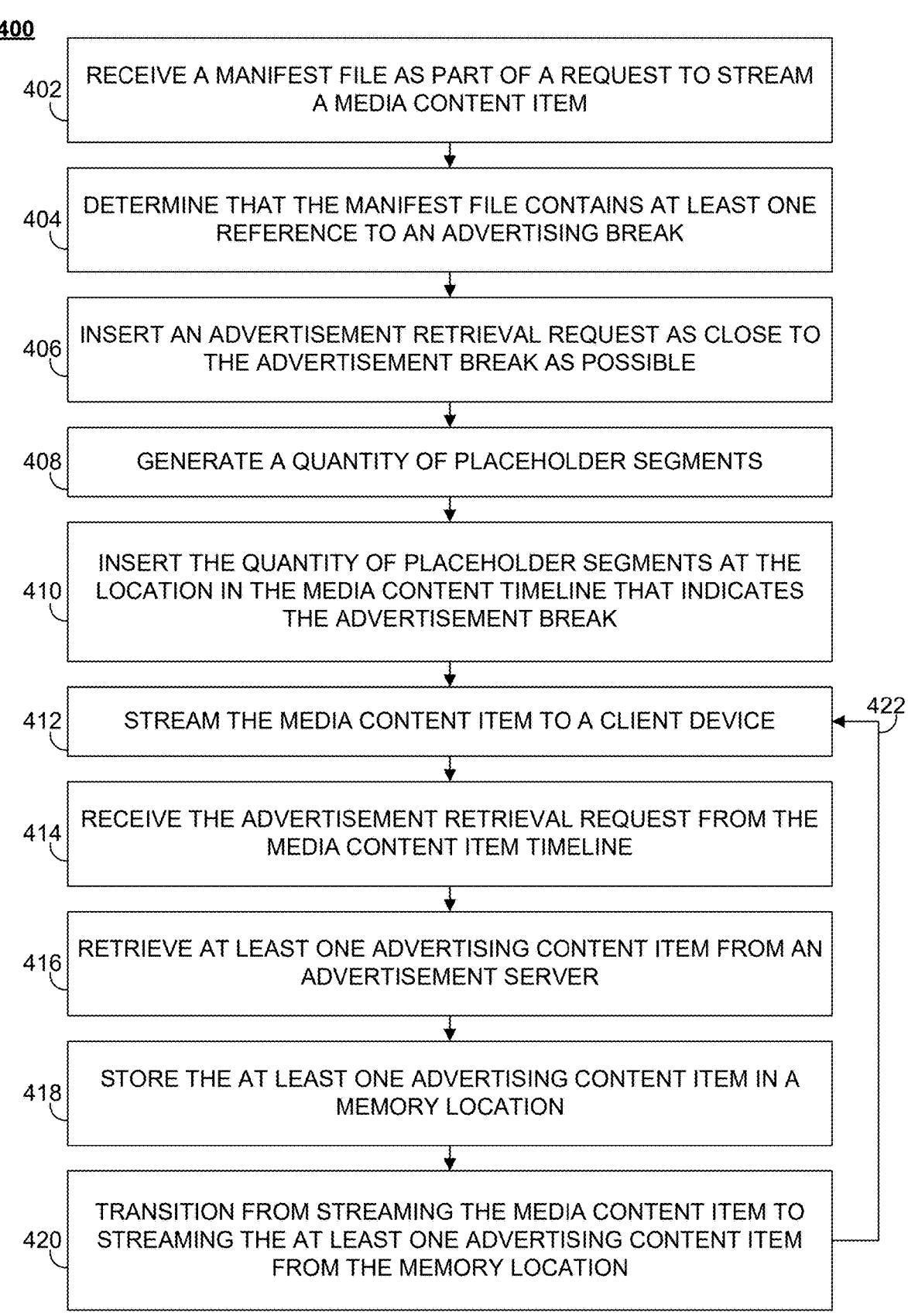

400

402 RECEIVE A MANIFEST FILE AS PART OF A REQUEST TO STREAM A MEDIA CONTENT ITEM

404 DETERMINE THAT THE MANIFEST FILE CONTAINS AT LEAST ONE REFERENCE TO AN ADVERTISING BREAK

406 INSERT AN ADVERTISEMENT RETRIEVAL REQUEST AS CLOSE TO THE ADVERTISEMENT BREAK AS POSSIBLE

408 GENERATE A QUANTITY OF PLACEHOLDER SEGMENTS

410 INSERT THE QUANTITY OF PLACEHOLDER SEGMENTS AT THE LOCATION IN THE MEDIA CONTENT TIMELINE THAT INDICATES THE ADVERTISEMENT BREAK

412 STREAM THE MEDIA CONTENT ITEM TO A CLIENT DEVICE 422

414 RECEIVE THE ADVERTISEMENT RETRIEVAL REQUEST FROM THE MEDIA CONTENT ITEM TIMELINE

416 RETRIEVE AT LEAST ONE ADVERTISING CONTENT ITEM FROM AN ADVERTISEMENT SERVER

418 STORE THE AT LEAST ONE ADVERTISING CONTENT ITEM IN A MEMORY LOCATION

420 TRANSITION FROM STREAMING THE MEDIA CONTENT ITEM TO STREAMING THE AT LEAST ONE ADVERTISING CONTENT ITEM FROM THE MEMORY LOCATION

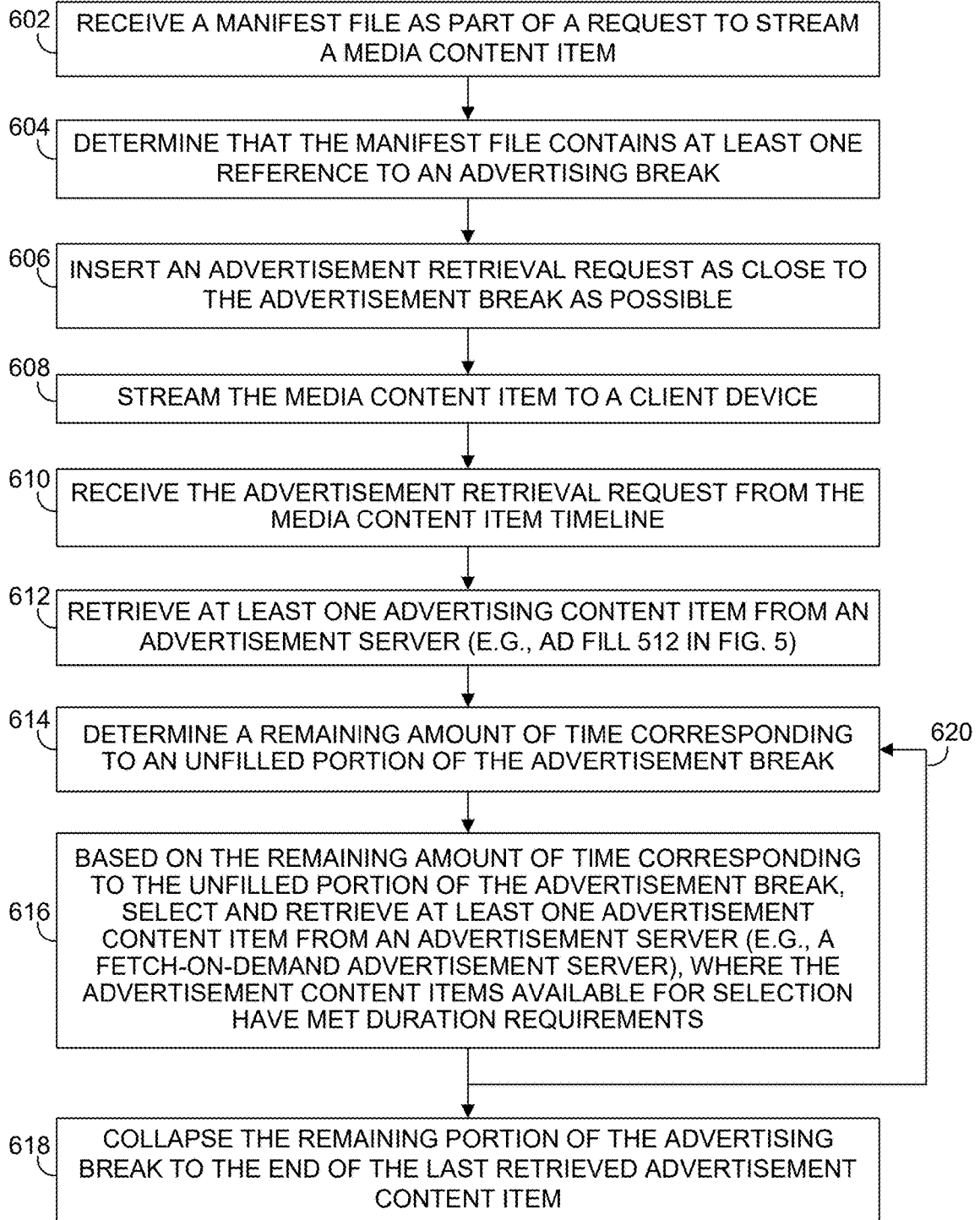

602 | RECEIVE A MANIFEST FILE AS PART OF A REQUEST TO STREAM A MEDIA CONTENT ITEM

604 | DETERMINE THAT THE MANIFEST FILE CONTAINS AT LEAST ONE REFERENCE TO AN ADVERTISING BREAK

606 | INSERT AN ADVERTISEMENT RETRIEVAL REQUEST AS CLOSE TO THE ADVERTISEMENT BREAK AS POSSIBLE

608 | STREAM THE MEDIA CONTENT ITEM TO A CLIENT DEVICE

610 | RECEIVE THE ADVERTISEMENT RETRIEVAL REQUEST FROM THE MEDIA CONTENT ITEM TIMELINE

612 | RETRIEVE AT LEAST ONE ADVERTISING CONTENT ITEM FROM AN ADVERTISEMENT SERVER (E.G., AD FILL 512 IN FIG. 5)

614 | DETERMINE A REMAINING AMOUNT OF TIME CORRESPONDING TO AN UNFILLED PORTION OF THE ADVERTISEMENT BREAK     620

616 | BASED ON THE REMAINING AMOUNT OF TIME CORRESPONDING TO THE UNFILLED PORTION OF THE ADVERTISEMENT BREAK, SELECT AND RETRIEVE AT LEAST ONE ADVERTISEMENT CONTENT ITEM FROM AN ADVERTISEMENT SERVER (E.G., A FETCH-ON-DEMAND ADVERTISEMENT SERVER), WHERE THE ADVERTISEMENT CONTENT ITEMS AVAILABLE FOR SELECTION HAVE MET DURATION REQUIREMENTS

618 | COLLAPSE THE REMAINING PORTION OF THE ADVERTISING BREAK TO THE END OF THE LAST RETRIEVED ADVERTISEMENT CONTENT ITEM

FIG. 6

METHODS, SYSTEMS, AND MEDIA FOR STREAMING MEDIA CONTENT ITEMS CONTAINING ADVERTISING CONTENT

CROSS-REFERENCE TO RELATED APPLICATIONS

This application claims the benefit of U.S. Provisional Patent Application No. 63/468,993, filed May 25, 2023, and claims the benefit of U.S. Provisional Patent Application No. 63/553,879, filed Feb. 15, 2024, each of which is hereby incorporated by reference herein in its entirety.

TECHNICAL FIELD

The disclosed subject matter relates to methods, systems, and media for streaming media content items containing advertising content.

BACKGROUND

Many people use Internet-connected applications to stream media content items, including movies, television shows, music videos, and music. In some examples, the Internet-connected applications provide users with access to their media content for free while being supported by advertising revenue. Advertising revenue can be generated by inserting advertising content into a media content item, and the consumer can be required to watch the advertising content in exchange for continued viewing of the media content item. The Internet-connected application then tracks the viewed advertisements, and advertising companies whose advertising content is viewed then pay the Internet-connected application.

In such situations, an Internet-connected application often pre-loads all of the advertising content needed for the entire duration of playback of the media content item. However, if the user does not watch the entire media content item, then some of the advertising content also goes unwatched. Thus, the effort to pre-load the advertising content into the media content item is wasted, leading to an inefficient use of resources by the Internet-connected application.

Accordingly, it is desirable to provide new mechanisms for streaming media content items containing advertising content.

SUMMARY

Methods, systems, and media for streaming media content items containing advertising content are provided.

In accordance with some embodiments of the disclosed subject matter, a method for inserting content into media content is provided, the method comprising: identifying, in a manifest file at a server used to stream media content items, at least one indication that at least one advertising content item is to be played back at a first playback position for a first duration when streaming a media content item; determining a retrieval time to retrieve the at least one advertising content item from an advertising source; inserting, into the manifest file at the server used to stream media content items, a retrieval indication that the at least one advertising content item is to be retrieved from the advertising source at a second playback time, wherein the second playback time is determined based on the first playback position and the retrieval time; generating, at the server used to stream media content items, a first quantity of placeholder segments and inserting the first quantity of placeholder segments into the media content item at the first playback position; retrieving at least one advertising content item from the advertising source when streaming of the media content item has reached the second playback position; storing the at least one advertising content item in a first memory location; and transitioning from streaming one of the plurality of streaming segments and the placeholder segments to streaming the advertisement content item from the first memory location.

In some embodiments, retrieving at least one advertising content item from the advertising source when streaming of the media content item has reached the second playback position further comprises performing an advertising auction at the advertising source.

In some embodiments, each placeholder segment is a second duration.

In some embodiments, a total duration across a sum of the first quantity of placeholder segments is equal to the first duration.

In some embodiments, a third duration of the at least one advertising content item is different than the total duration for the first quantity of placeholder segments.

In some embodiments, each placeholder segment includes a discontinuity tag.

In accordance with some embodiments of the disclosed subject matter, a system for inserting content into media content is provided, the system comprising a hardware processor that is configured to: identify, in a manifest file at a server used to stream media content items, at least one indication that at least one advertising content item is to be played back at a first playback position for a first duration when streaming a media content item; determine a retrieval time to retrieve the at least one advertising content item from an advertising source; insert, into the manifest file at the server used to stream media content items, a retrieval indication that the at least one advertising content item is to be retrieved from the advertising source at a second playback time, wherein the second playback time is determined based on the first playback position and the retrieval time; generate, at the server used to stream media content items, a first quantity of placeholder segments and insert the first quantity of placeholder segments into the media content item at the first playback position; retrieve at least one advertising content item from the advertising source when streaming of the media content item has reached the second playback position; store the at least one advertising content item in a first memory location; and transition from streaming one of the plurality of streaming segments and the placeholder segments to streaming the advertisement content item from the first memory location.

In accordance with some embodiments of the disclosed subject matter, a computer-readable medium containing computer executable instructions that, when executed by a processor, cause the processor to perform a method for inserting content into media content is provided, the method comprising: identifying, in a manifest file at a server used to stream media content items, at least one indication that at least one advertising content item is to be played back at a first playback position for a first duration when streaming a media content item; determining a retrieval time to retrieve the at least one advertising content item from an advertising source; inserting, into the manifest file at the server used to stream media content items, a retrieval indication that the at least one advertising content item is to be retrieved from the advertising source at a second playback time, wherein the second playback time is determined based on the first playback position and the retrieval time; generating, at the server used to stream media content items, a first quantity of placeholder segments and inserting the first quantity of placeholder segments into the media content item at the first playback position; retrieving at least one advertising content item from the advertising source when streaming of the media content item has reached the second playback position; storing the at least one advertising content item in a first memory location; and transitioning from streaming one of the plurality of streaming segments and the placeholder segments to streaming the advertisement content item from the first memory location.

In accordance with some embodiments of the disclosed subject matter, a system for inserting content into media content is provided, the system comprising: means for identifying, in a manifest file at a server used to stream media content items, at least one indication that at least one advertising content item is to be played back at a first playback position for a first duration when streaming a media content item; means for determining a retrieval time to retrieve the at least one advertising content item from an advertising source; means for inserting, into the manifest file at the server used to stream media content items, a retrieval indication that the at least one advertising content item is to be retrieved from the advertising source at a second playback time, wherein the second playback time is determined based on the first playback position and the retrieval time; means for generating, at the server used to stream media content items, a first quantity of placeholder segments and means for inserting the first quantity of placeholder segments into the media content item at the first playback position; means for retrieving at least one advertising content item from the advertising source when streaming of the media content item has reached the second playback position; means for storing the at least one advertising content item in a first memory location; and means for transitioning from streaming one of the plurality of streaming segments and the placeholder segments to streaming the advertisement content item from the first memory location.

In accordance with some embodiments of the disclosed subject matter, a method for inserting content into media content is provided, the method comprising: identifying, in a manifest file at a server used to stream media content items, at least one indication that at least one advertising content item is to be played back at a first playback position for a first duration when streaming a media content item; determining a retrieval time to retrieve the at least one advertising content item from an advertising source for an advertisement break; inserting, into the manifest file at the server used to stream media content items, a retrieval indication that the at least one advertising content item is to be retrieved from the advertising source at a second playback time; retrieving the at least one advertising content item from the advertising source when streaming of the media content item has reached the second playback position; determining a remaining amount of time corresponding to an unfilled portion of the advertisement break based on a duration of the at least one advertising content item; based on the remaining amount of time corresponding to the unfilled portion of the advertising break, retrieving at least one additional advertisement content item for insertion in the unfilled portion of the advertising break, wherein the at least one additional advertisement content item is selected from a plurality of processed advertising content items received from a plurality of network sources, wherein each of the plurality of network sources has uploaded and assigned at least a first advertising content item having a first duration and at least a second advertising content item having a second duration, and wherein the first duration associated with the first advertising content item is determined to be within a first range and the second duration associated with the second advertising content item is determined to be within a second range; and collapsing the remaining portion of the advertising break to the end of the at least one additional advertising content item that was retrieved.

In accordance with some embodiments of the disclosed subject matter, a system for inserting content into media content is provided, the system comprising a hardware processor that is configured to: identify, in a manifest file at a server used to stream media content items, at least one indication that at least one advertising content item is to be played back at a first playback position for a first duration when streaming a media content item; determine a retrieval time to retrieve the at least one advertising content item from an advertising source for an advertisement break; insert, into the manifest file at the server used to stream media content items, a retrieval indication that the at least one advertising content item is to be retrieved from the advertising source at a second playback time; retrieve the at least one advertising content item from the advertising source when streaming of the media content item has reached the second playback position; determine a remaining amount of time corresponding to an unfilled portion of the advertisement break based on a duration of the at least one advertising content item; based on the remaining amount of time corresponding to the unfilled portion of the advertising break, retrieve at least one additional advertisement content item for insertion in the unfilled portion of the advertising break, wherein the at least one additional advertisement content item is selected from a plurality of processed advertising content items received from a plurality of network sources, wherein each of the plurality of network sources has uploaded and assigned at least a first advertising content item having a first duration and at least a second advertising content item having a second duration, and wherein the first duration associated with the first advertising content item is determined to be within a first range and the second duration associated with the second advertising content item is determined to be within a second range; and collapse the remaining portion of the advertising break to the end of the at least one additional advertising content item that was retrieved.

In accordance with some embodiments of the disclosed subject matter, a computer-readable medium containing computer executable instructions that, when executed by a processor, cause the processor to perform a method for inserting content into media content is provided, the method comprising: identifying, in a manifest file at a server used to stream media content items, at least one indication that at least one advertising content item is to be played back at a first playback position for a first duration when streaming a media content item; determining a retrieval time to retrieve the at least one advertising content item from an advertising source for an advertisement break; inserting, into the manifest file at the server used to stream media content items, a retrieval indication that the at least one advertising content item is to be retrieved from the advertising source at a second playback time; retrieving the at least one advertising content item from the advertising source when streaming of the media content item has reached the second playback position; determining a remaining amount of time corresponding to an unfilled portion of the advertisement break based on a duration of the at least one advertising content item; based on the remaining amount of time corresponding to the unfilled portion of the advertising break, retrieving at least one additional advertisement content item for insertion in the unfilled portion of the advertising break, wherein the at least one additional advertisement content item is selected from a plurality of processed advertising content items received from a plurality of network sources, wherein each of the plurality of network sources has uploaded and assigned at least a first advertising content item having a first duration and at least a second advertising content item having a second duration, and wherein the first duration associated with the first advertising content item is determined to be within a first range and the second duration associated with the second advertising content item is determined to be within a second range; and collapsing the remaining portion of the advertising break to the end of the at least one additional advertising content item that was retrieved.

In accordance with some embodiments of the disclosed subject matter, a system for inserting content into media content is provided, the system comprising: means for identifying, in a manifest file at a server used to stream media content items, at least one indication that at least one advertising content item is to be played back at a first playback position for a first duration when streaming a media content item; means for determining a retrieval time to retrieve the at least one advertising content item from an advertising source for an advertisement break; means for inserting, into the manifest file at the server used to stream media content items, a retrieval indication that the at least one advertising content item is to be retrieved from the advertising source at a second playback time; means for retrieving the at least one advertising content item from the advertising source when streaming of the media content item has reached the second playback position; means for determining a remaining amount of time corresponding to an unfilled portion of the advertisement break based on a duration of the at least one advertising content item; based on the remaining amount of time corresponding to the unfilled portion of the advertising break, means for retrieving at least one additional advertisement content item for insertion in the unfilled portion of the advertising break, wherein the at least one additional advertisement content item is selected from a plurality of processed advertising content items received from a plurality of network sources, wherein each of the plurality of network sources has uploaded and assigned at least a first advertising content item having a first duration and at least a second advertising content item having a second duration, and wherein the first duration associated with the first advertising content item is determined to be within a first range and the second duration associated with the second advertising content item is determined to be within a second range; and means for collapsing the remaining portion of the advertising break to the end of the at least one additional advertising content item that was retrieved.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 4 is an illustrative example of a flow diagram of a process for streaming media content items containing advertising content in accordance with some embodiments of the disclosed subject matter.

FIG. 6 is an illustrative example of a flow diagram of a process for streaming media content items containing advertising content using the ad collapsing mechanisms described herein in accordance with some embodiments of the disclosed subject matter.

DETAILED DESCRIPTION

Figure 1:
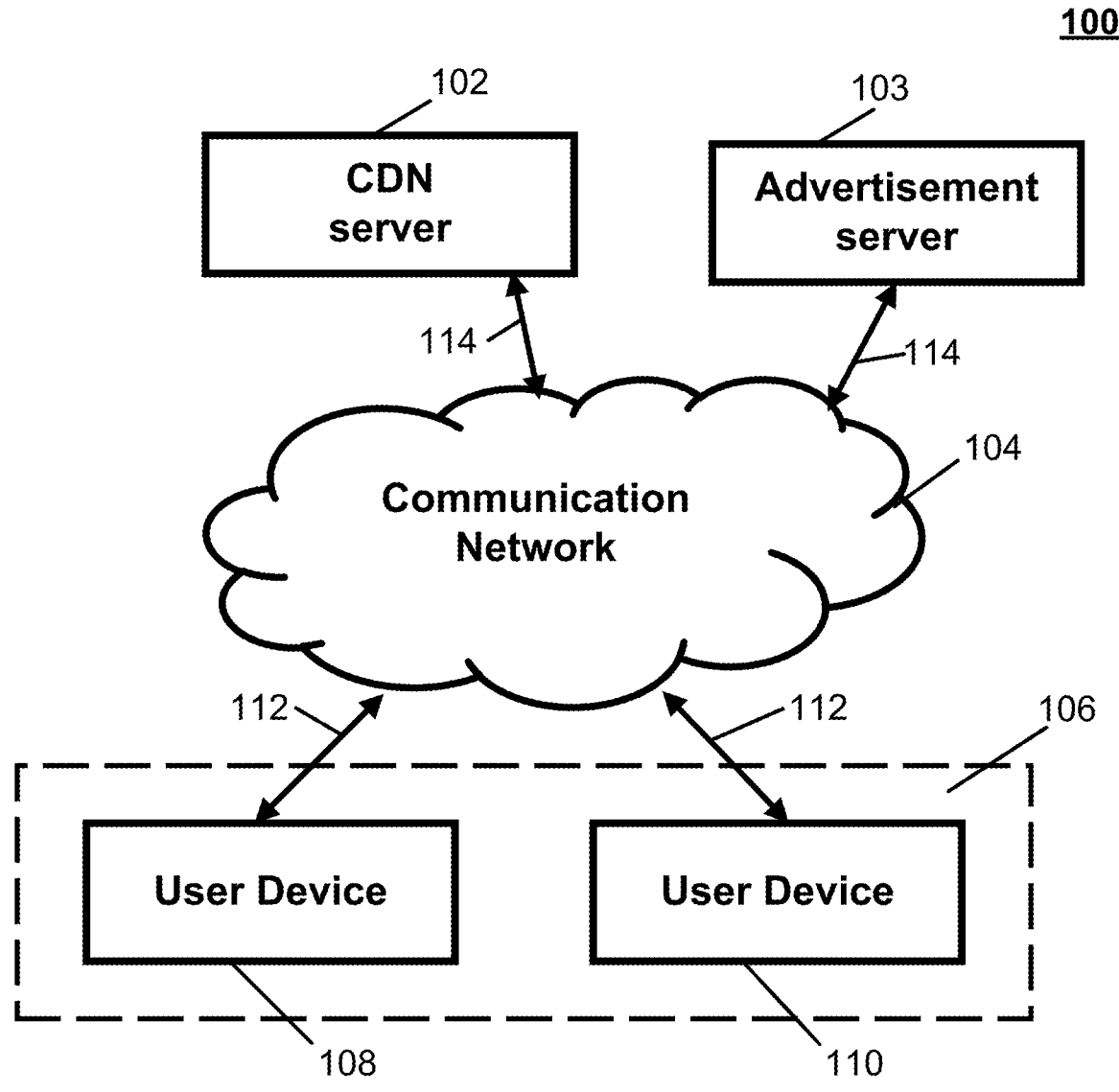
FIG. 1 is an example block diagram of a system that can be used to implement mechanisms described herein in accordance with some embodiments of the disclosed subject matter.
Figure 2:
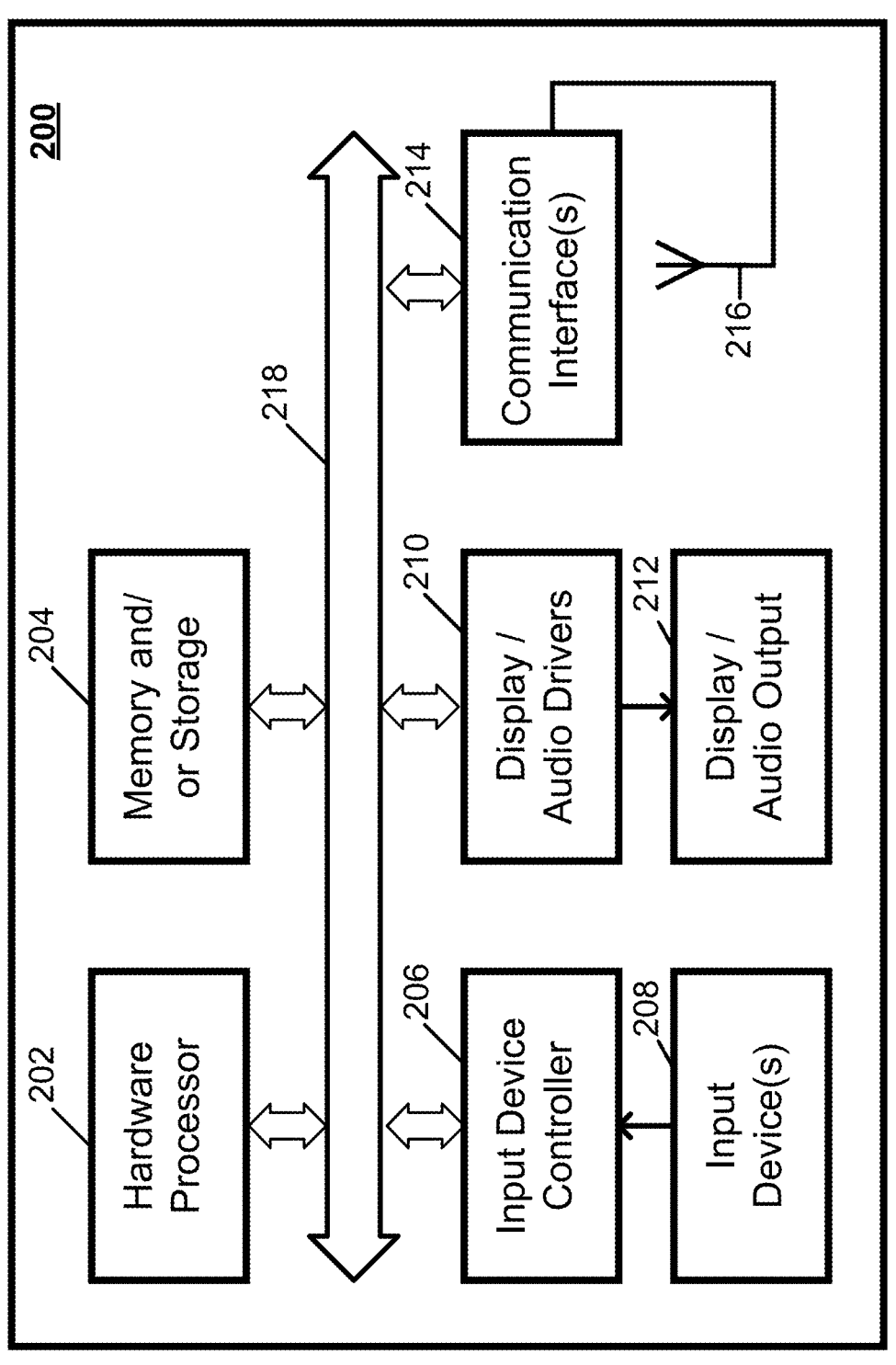
FIG. 2 is an example block diagram of hardware that can be used in a server and/or a user device of FIG. 1 in accordance with some embodiments of the disclosed subject matter.

In accordance with various embodiments of the disclosed subject matter, mechanisms (which can include methods, systems, and media) for streaming media content items containing advertising content are provided.

Advertising video-on-demand (AVOD) services are platforms that allow users to watch video content for free, with the condition that the users view advertisements in between segments of content. Such platforms generate revenue by selling advertisement space to advertisers, thus allowing AVOD services to offer a wide variety of content, ranging from movies and TV shows to short clips, user-submitted content, and music videos.

AVOD platforms commonly use one of two approaches to insert advertisements into video content, client-side advertisement insertion (CSAI) and dynamic or server-side advertisement insertion (DAI and SSAI, respectively). Both approaches generally require a content delivery network (CDN), an advertisement server, and a client-side application. The CDN can be responsible for storing and delivering video content to the user. The advertisement server can be responsible for serving ads to users and tracking advertisement performance. The client-side application can be the interface that users interact with to access the content.

When a user requests a video on an AVOD platform, the client-side application sends a request to the CDN to retrieve the video content. The CDN then requests advertising content from an advertisement server and/or advertisement decisioning engine. Once the advertisement server and/or advertisement decisioning engine selects appropriate advertisements, the CDN inserts advertising content into the video content before streaming to the user. In most circumstances, all of the advertising content needed for the duration of the video content is fetched from an advertisement server and pre-loaded in the designated locations within the video content. If a user navigates away from playback of the video content prior to playback of all of the advertising content (e.g., due to lack of interest in the video content, due to a poor streaming environment, due to a poor Internet connection, etc.), the CDN is left with advertising content that has not been sent to the user and/or viewed in the playback application. Any resources (e.g., API calls, server time, decision engine time, etc.) that were used to select the appropriate advertisements and insert them into the video content are therefore wasted.

In some embodiments, mechanisms can be provided that insert advertising content into placeholder segments (for example, 5 second segments of equal length) that are inserted into the video stream for an advertisement break, where an advertisement fetch signal is inserted as close to an advertisement break as possible (e.g., just-in-time) that triggers an advertisement call for the upcoming advertisement break.

In some embodiments, the mechanisms can use a manifest file to identify advertisement breaks where advertising content is to be shown in between the playback of segments of a given media content item. In some embodiments, the manifest file can list a start time, an end time, and/or a duration for each advertisement break. In some embodiments, the mechanisms can determine how long it will take for the mechanisms to retrieve advertising content (e.g., from a particular advertising content source), and can insert an advertisement retrieval request into the manifest file at a time before the advertisement break according to this determination.

Additionally, in some embodiments, the mechanisms can generate and insert a plurality of placeholder segments into the media content item at the playback locations indicated for the advertising break. Then, when the media content item is streamed to a user device, the mechanisms can receive the advertisement retrieval request at the pre-indicated time, and can retrieve advertising content from an advertising source (e.g., advertising server that can run an advertising auction). In some embodiments, the mechanisms can store the advertising content in a cached location. Once streaming of the media content item reaches the placeholder segments, the mechanisms can transition to streaming the advertising content from the cached location.

In some embodiments, each placeholder segment can have a short duration compared to the duration of the advertising break. In some embodiments, a quantity of placeholder segments can be used to fill the entire duration of the advertising break with placeholder segments of the same duration. In some embodiments, the placeholder segments can contain a discontinuity tag.

Alternatively to generating and inserting a plurality of placeholder segments into the media content item at the playback locations indicated for the advertising break, in some embodiments, the mechanisms can determine a remaining amount of time corresponding to an unfilled portion of an advertising break. Based on the remaining amount of time corresponding to the unfilled portion of the advertising break, the mechanisms can, in turn, retrieve at least one advertisement content item for insertion in the unfilled portion of the advertising break, thereby resulting in a remaining portion of the advertising break, and collapsing the remaining portion of the advertising break to the end of the at least one advertising content item that was retrieved. This can, for example, condense the remaining amount of time in an unfilled portion of an advertising break with short form advertising content (e.g., advertising that is between five to ten seconds in length, advertising that is between ten to fifteen seconds in length, etc.). This can also, for example, promote continued engagement in the media content item, where the viewer can be presented with one or more shorter advertising content items instead of three hundred seconds worth of advertising content in an advertising break.

It should be noted that any suitable number of advertising content items can be selected and retrieved for insertion into the advertising break based on the remaining amount of time corresponding to the unfilled portion of the advertising break. For example, based on the remaining amount of time corresponding to the unfilled portion of the advertising break, a single advertising content item can be selected and retrieved for insertion into the advertising break. In another example, a single advertising content item can be selected and retrieved for insertion into the advertising break as long as the duration of the single advertising content item is less than the remaining amount of time corresponding to the unfilled portion of the advertising break. In yet another example, multiple advertising content items can be selected and retrieved for insertion into the advertising break, where each advertising content item has a duration that is less than a predetermined duration and where the total duration of the multiple advertising content items is less than the remaining amount of time corresponding to the unfilled portion of the advertising break. In a further example, multiple advertising content items can be selected and retrieved for insertion into the advertising break based on a predetermined number of advertising content items to be shown during the advertising break (e.g., where a macro, tag, or other value associated with the content stream or advertisement-related stream URL can indicate whether or not house advertisements are included, a maximum length of an advertising content item in seconds, a minimum length of an advertising content item in seconds, the number of advertisement slots to fill for an advertisement pod, a length of an advertisement pod in seconds, etc.).

In some embodiments, these mechanisms can receive a plurality of advertising content items from one or more network sources. For example, in order for an advertising content item to be eligible for selection and retrieval for insertion into an advertising break, the mechanisms can determine whether multiple advertising content items provided by a network source meets particular criterion. In continuing this example, the mechanisms can determine whether the network source has provided at least a first advertising content item having a first duration and at least a second advertising content item having a second duration and can determine whether the first duration associated with the first advertising content item is within a first range and whether the second duration associated with the second advertising content item is within a second range. In a more particular example, the mechanisms can determine whether at least a first advertising content item that is between 30 seconds and 60 seconds has been received from the network source and at least a second advertising content item that is between 5 seconds and 10 seconds has been received from the network source.

It should be noted that the advertising content items can be received using any suitable approach. For example, a network source can upload one or more advertising content items to a corresponding advertisement network, such as a fetch-on-demand advertisement network. In a more particular example, the mechanisms can provide a stream URL or any other suitable identifier of an on-demand video stream and the network source can upload one or more advertising content items in any suitable format, such as .mp4 format or .mov format. In another example, a network source can provide a URL or any other suitable link that points directly to the advertising content item. In response to receiving the advertising content items from the network source, the mechanisms can process these advertising content items (which are sometimes referred to as "house advertisements") and, upon completion of such processing, the mechanisms can add the processed advertising content items to a list of valid house advertisements for possible selection and retrieval for insertion into an advertising break. It should be noted that previously provided house advertisements can be processed at an expedited rate when adding the processed advertising content items to a list of valid house advertisements for possible selection and retrieval for insertion into an advertising break.

In some embodiments, in response to determining that the network source has provided at least a first advertising content item having a first duration and at least a second advertising content item having a second duration and in response to determining that the first duration associated with the first advertising content item is within a first range and that the second duration associated with the second advertising content item is within a second range, the mechanisms can determine whether the network source has assigned the advertising content items to a corresponding advertisement network, such as a fetch-on-demand advertisement network.

In some embodiments, the mechanisms can include a stream integrity feature that preserves user experience in viewing a video stream. For example, in response to determining that the duration criterion for advertising content items has not been met (e.g., that the first advertising content item is not within a first range, that the second duration associated with the second advertising content item is not within a second range, or that multiple advertising content items have been received), the mechanisms can execute a failsafe feature to preserve the user experience in viewing the video stream that can include selecting multiple advertisements to collapse a gap in an advertising break.

These and other features for streaming media content items containing advertising content are further described in connection with FIGS. 1-6.

Turning to FIG. 1, an example 100 of hardware for streaming media content items containing advertising content in accordance with some embodiments is shown. As illustrated, hardware 100 can include a content delivery network (CDN) server 102, an advertisement server 103, a communication network 104, and/or one or more user devices 106, such as user devices 108 and 110.

CDN server 102 and advertisement server 103 can be any suitable server(s) for storing information, data, programs, media content, and/or any other suitable content. In some embodiments, CDN server 102 can perform any suitable function(s). For example, in some embodiments, CDN server 102 can store one or more versions of media content items, receive requests to stream media content items, route requests to additional servers such as advertisement server 103, insert additional content into media content items (such as advertisements), and deliver media content and/or advertising content items to a user device such as user devices 108 and 110.

In some embodiments, advertisement server 103 can perform any suitable function(s). For example, in some embodiments, advertisement server 103 can receive requests for advertising content items, route requests to advertising auctions and/or receive bids during an auction for advertising space in a media content item, select appropriate advertisements based on received information (e.g., demographic data, location, etc.), and deliver advertising content items to a server such as CDN 102 and/or a user device such as user devices 108 and 110.

Communication network 104 can be any suitable combination of one or more wired and/or wireless networks in some embodiments. For example, communication network can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 106 can be connected by one or more communications links (e.g., communications links 112) to communication network 104 that can be linked via one or more communications links (e.g., communications links 114) to server 102. The communications links can be any communications links suitable for communicating data among user devices 106 and server 102 such as network links, dial-up links, wireless links, hard-wired links, any other suitable communications links, or any suitable combination of such links.

User devices 106 can include any one or more user devices suitable for use with process 400. In some embodiments, user device 106 can include any suitable type of user device, such as speakers (with or without voice assistants), mobile phones, tablet computers, wearable computers, laptop computers, desktop computers, smart televisions, media players, game consoles, vehicle information and/or entertainment systems, and/or any other suitable type of user device.

Although CDN server 102 and advertisement server 103 are each illustrated as one device, the functions performed by CDN server 102 and advertisement server 103 can be performed using any suitable number of devices in some embodiments. For example, in some embodiments, multiple devices can be used to implement the functions performed by CDN server 102 and/or advertisement server 103.

Although two user devices 108 and 110 are shown in FIG. 1 to avoid overcomplicating the figure, any suitable number of user devices, (including only one user device) and/or any suitable types of user devices, can be used in some embodiments.

CDN server 102, advertisement server 103, and user devices 106 can be implemented using any suitable hardware in some embodiments. For example, in some embodiments, devices 102, 103, and 106 can be implemented using any suitable general-purpose computer or special-purpose computer and can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 204, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 202 can be controlled by a computer program stored in memory and/or storage 204. For example, in some embodiments, the computer program can cause hardware processor 202 to perform functions described herein.

Memory and/or storage 204 can be any suitable memory and/or storage for storing programs, data, documents, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some embodiments. For example, input device controller 206 can be circuitry for receiving input from a touchscreen, from a keyboard, from a mouse, from one or more buttons, from a voice recognition circuit, from one or more microphones, from a camera, from an optical sensor, from an accelerometer, from a temperature sensor, from a near field sensor, and/or any other type of input device.

Display/audio drivers 210 can be any suitable circuitry for controlling and driving output to one or more display/audio output devices 212 in some embodiments. For example, display/audio drivers 210 can be circuitry for driving a touchscreen, a flat-panel display, a cathode ray tube display, a projector, a speaker or speakers, and/or any other suitable display and/or presentation devices.

Communication interface(s) 214 can be any suitable circuitry for interfacing with one or more communication networks, such as network 104 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network (e.g., communication network 104) in some embodiments. In some embodiments, antenna 216 can be omitted.

Bus 218 can be any suitable mechanism for communicating between two or more components 202, 204, 206, 210, and 214 in some embodiments.

Any other suitable components can be included in hardware 200 in accordance with some embodiments.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Figure 3:
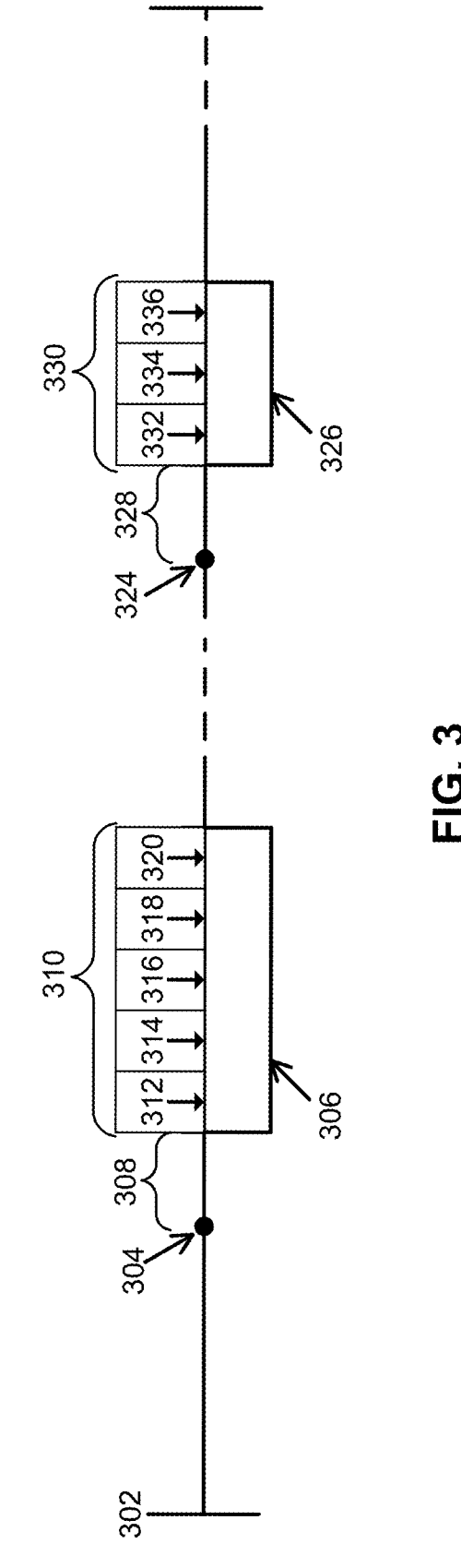
FIG. 3 is an illustrative example of a timeline for streaming media content items containing advertising content in accordance with some embodiments of the disclosed subject matter.

Turning to FIG. 3, an illustrative example of a timeline 300 for streaming a media content item with advertising content in accordance with some embodiments of the disclosed subject matter is shown. In some embodiments, timeline 300 can include a media content item start time 302, advertisement retrieval requests 304 and 324, advertisement breaks 306 and 326, advertisement retrieval times 308 and 328, and advertising placeholders 310 and 330.

In some embodiments, timeline 300 can represent a streaming media timeline. In some embodiments, timeline 300 can be included in any suitable manifest file using any suitable streaming media protocol, any suitable audio coding format, and any suitable video coding format. For example, timeline 300 can represent a media content item that is segmented for streaming to a client device according to mechanisms found in HTTP Live Streaming (HLS), Smooth Streaming, HTTP Dynamic Streaming (HDS), MPEG Dynamic Adaptive Streaming over HTTP (MPEG-DASH), and/or any other suitable streaming technique.

In some embodiments, the manifest file containing timeline 300 can be manipulated at a media content server (such as CDN server 102) prior to the start of streaming media content item segments to a client device. In some embodiments, the manifest file containing timeline 300 can be manipulated at the media content server during streaming of the media content item segments to the client device. For example, the manifest file containing timeline 300 can be manipulated at the media content server to include any suitable additional content, such as advertising content, placeholders for advertising content, etc. As a particular example, in some embodiments, a CDN server can modify the manifest file to include advertisement retrieval requests 304 and/or 324, advertisement retrieval times 308 and/or 328, and advertising placeholders 310 and/or 330. That is, the manifest file can initially only contain references to the advertisement breaks 306 and/or 326, and any suitable mechanism (such as process 400 as described below in connection with FIG. 4) can modify and/or manipulate the manifest file to include additional items on timeline 300.

Alternatively, in some embodiments, the manifest file containing timeline 300 can be manipulated at the client device. For example, in some embodiments, the manifest file can contain references to advertising breaks, and the client device can request advertising content from an advertising server. Continuing this example, in some embodiments, the client device can insert the advertising content received from an advertising server into timeline 300 of the manifest file.

In some embodiments, timeline 300 can include start time 302. In some embodiments, start time 302 can be the time when a server begins streaming segments of media content to a client device. In some embodiments, start time 302 can be the time when a client device receives any suitable content from a streaming server. In some embodiments, start time 302 can be the time when any suitable application on the client device begins playback of streaming media content received from a streaming server.

In some embodiments, timeline 300 can include advertisement retrieval requests 304 and 324. In some embodiments, timeline 300 can be modified (e.g., through manipulation of the manifest file) to include advertisement retrieval requests 304 and/or 324. In some embodiments, advertisement retrieval requests 304 and/or 324 can be inserted into timeline 300 at any suitable time. For example, in some embodiments, advertisement retrieval requests 304 and/or 324 can be inserted into timeline 300 prior to start time 302, where start time 302 is a time when a streaming server (such as CDN 102 as described above in connection with FIG. 1) begins to send segments of a media content item to a client device. In another example, in some embodiments, advertisement retrieval requests 304 and/or 324 can be inserted into timeline 300 after the start time 302, where start time 302 is a time when a streaming server (such as CDN 102 as described above in connection with FIG. 1) begins to send segments of a media content item to a client device.

In some embodiments, advertisement retrieval requests 304 and/or 324 can include any suitable information. For example, advertisement retrieval requests 304 and/or 324 can include a request for a server that is streaming the segments of a media content item to provide, request, and/or retrieve advertising content items. In some embodiments, advertisement retrieval requests 304 and/or 324 can specify a particular advertisement server (such as advertisement server 103 as described above in connection with FIG. 1) to use in the retrieval of advertising content, a duration of advertising content needed for an upcoming advertising break, any suitable information needed to personalize the advertising content to the user of the client device receiving the media stream, and/or any other suitable information.

In some embodiments, the location of advertisement retrieval requests 304 and/or 324 on timeline 300 can be determined using any suitable mechanisms. For example, in some embodiments, advertisement retrieval requests 304 and/or 324 can be inserted into a manifest file at any suitable location on timeline 300 before an advertising break, such as before advertising breaks 306 and/or 326, respectively.

In some embodiments, any suitable mechanism can be used to determine advertisement retrieval time(s) 308 and 328, respectively, where the advertisement retrieval time 308 can be a minimum amount of time required for a server such as CDN server 102 to retrieve advertising content, e.g., from advertisement server 103. Similarly, advertisement retrieval time 328 can be a minimum amount of time (that is the same or different from advertisement retrieval time 328) required for a server such as CDN server 102 to retrieve advertising content, e.g., from advertisement server 103. In some embodiments, advertisement retrieval time 308 can be different than advertisement retrieval time 328, for example due to differences in network traffic expected at a beginning of timeline 300 (such as for advertisement retrieval time 308) compared to expected network traffic at a later point of timeline 300 (such as for advertisement retrieval time 328).

In some embodiments, advertisement retrieval time(s) 308 and/or 328 can have any suitable value, such as 1 second, 2 seconds, 5 seconds, and/or any other suitable value.

In some embodiments, any suitable mechanism can be used to determine and/or estimate advertisement retrieval time(s) 308 and/or 328. For example, in some embodiments, a process such as process 400 as described in connection with FIG. 4 below can receive a manifest file containing timeline 300 and can identify advertising breaks 306 and/or 326. Continuing this example, in some embodiments, any suitable mechanism, such as process 400, can collect statistics on network traffic (e.g., available bandwidth, upload speeds, download speeds, etc.) between a server such as CDN 102 and a client device such as user devices 106, and/or between a server such as CDN 102 and service that provides advertising content, such as advertisement server 103.

In some embodiments, any other information can be used to determine advertisement retrieval time(s) 308 and/or 328. For example, in some embodiments, advertisement server 103 can have an average time to complete an advertisement auction, which can be used to determine advertisement retrieval time(s) 308 and/or 328. In some embodiments, any suitable mechanism can survey several advertisement server(s) 103 to find a particular advertisement server 103 that has the lowest average time to complete an advertisement auction, and the mechanisms can indicate (e.g., in advertisement retrieval request 304 and/or 324) that requests for advertising content are directed towards this particular advertisement server 103.

In some embodiments, any suitable mechanism can identify an advertisement server 103 that has any other properties, such as providing advertising content from certain brand(s), for certain product categories and/or service(s), and/or any suitable capabilities for personalizing advertising content based on any suitable input information (e.g., demographic information, location, viewing history and/or advertising profile information). In some embodiments, any suitable mechanisms can determine an estimated wait time for a given server (such as an advertisement server with properties as listed above) to provide advertising content once a request has been submitted.

In some embodiments, advertisement retrieval time(s) 308 and/or 328 can be updated based on previous values of advertisement retrieval time(s) used for streaming a prior media content item from the same CDN server 102 to a client device.

In some embodiments, advertisement retrieval requests 304 and/or 324 can be inserted into timeline 300 based upon advertisement retrieval time(s) 308 and/or 328. For example, in some embodiments, any suitable mechanism (such as process 400) can be used to modify the manifest file to include advertisement retrieval requests 304 and/or 324.

In some embodiments, advertisement breaks 306 and/or 326 can have any suitable duration. In some embodiments, advertisement breaks 306 and/or 326 can be listed in the manifest file using any suitable reference and/or notation, such as an advertisement marker. In some embodiments, advertisement breaks 306 and/or 326 can be associated with any suitable additional mechanisms and/or sub-processes, such as advertisement decisioning, advertisement insertion, and/or advertisement tracking. In some embodiments, advertisement breaks 306 and/or 326 can include a request for advertising content, which can be audio-visual content, audio-only content, video-only content, interactive content, and/or image content. In some embodiments, multiple advertising content items can be played during advertisement breaks 306 and/or 326. For example, advertisement break 306 can have a duration of 30 seconds and, based on any suitable decisioning made by an advertisement server that fulfills the request for ads associated with advertisement break 306, two 15 second clips can be played sequentially during advertisement break 306.

In some embodiments, advertisement breaks 306 and/or 326 can have any suitable duration such as 15 seconds, 30 seconds, 1 minute, 5 minutes, etc. In some embodiments, advertisement break 306 can have the same duration as advertisement break 326. In some embodiments, advertisement breaks 306 and 326 can have different durations. In some embodiments, advertisement breaks 306 and/or 326 can be located at any suitable position on timeline 300.

Note that, although two advertisement breaks 306 and 326 are shown in FIG. 3, timeline 300 can include any suitable number of advertisement breaks in some embodiments. In some embodiments, any advertisement breaks not shown on timeline 300 can have an associated advertisement retrieval request prior to the advertisement break, with an associated advertisement retrieval time that can be used to determine where to place the associated advertisement retrieval request on timeline 300.

In some embodiments, any suitable additional properties can be associated with advertisement breaks 306 and/or 326. For example, in some embodiments, the manifest file can include a reference and/or property that requires advertisements to be shown according to durations set by advertisement breaks 306 and/or 326. As a particular example, a user can seek along timeline 300 to any suitable position of the playback of the media content item. In this particular example, if the user happens to seek from a position along timeline 300 before advertisement break 306 and/or 326 to a position along timeline 300 that is after advertisement break 306 and/or 326, the advertisement breaks 306 and/or 326 can be adjusted to be played back immediately at the new timeline location, such that user receives the advertising content associated with advertisement break 306 and/or 326 prior to resuming streaming of the media content item at the timeline location. That is, in some embodiments, advertisement breaks 306 and/or 326 can be unskippable.

In some embodiments, advertisement breaks 306 and/or 326 can be skippable once advertising content has played for a subset of the duration of the advertising break. For example, in some embodiments, advertisement break 306 can be 1 minute (60 seconds) long. Continuing this example, advertising break 306 can include instructions for a media player to display a user interface component approximately 5 seconds into the 1 minute duration. Further continuing this example, a user interface signal can be received (e.g., at the server streaming the media content item) from the user interface component at approximately 10 seconds into the 1 minute duration of the advertisement break 306. Consequently, in this example and in some embodiments, advertising break 306 can end upon the receipt of the user interface signal after 10 seconds of advertisement playback.

In some embodiments, any suitable mechanism can be used to create placeholder segments for advertisement breaks 306 and/or 326. For example, in some embodiments, placeholder segments 310 and 330 can be generated prior to start time 302. In some embodiments, placeholder segments 310 can include segments 312-320, where each of segments 312, 314, 316, 318, and 320 can have the same duration, which can be any suitable duration (e.g., 5 sec). In some embodiments, placeholder segments 330 can include segments 332-336, where each of segments 332, 334, and 336 can have the same duration, which can be any suitable duration (e.g., 5 sec).

In some embodiments, any suitable mechanism or process can be used to determine how many segments to include in placeholder segments 310 and/or 330. For example, as discussed below at block 408 of process 400 in connection with FIG. 4, the number of placeholder segments that are included with placeholder segments 310 can be based on the duration of the advertisement segment 306. In some embodiments, each of segments 312, 314, 316, 318, 320, 332, 334, and 336 can include a discontinuity tag. In some embodiments, the discontinuity tag(s) can include a timecode indicating a location on timeline 300. In some embodiments, the discontinuity tag(s) can include an indication that the given placeholder segment is transitioning from streaming the media content segment(s) to streaming advertising content items. In some embodiments, the discontinuity tag(s) can include an indication that the given placeholder segment (e.g. segment 312) is streaming advertising content items and will continue streaming advertising content items after the given placeholder segment. In some embodiments, the discontinuity tag(s) can include an indication that the given placeholder segment (e.g. segment 320) is transitioning from streaming advertising content items to streaming the media content segment(s).

In some embodiments, placeholder segments 310 and/or 330 can be an interstitial reference. In some embodiments, when placeholder segments 310 and/or 330 are interstitial references, they can be signaled using a date-range tag, and/or can rely on program-date-time information already present in the media content item stream. In some embodiments, when placeholder segments 310 and/or 330 are interstitial references, they can be signaled using a particular pointer, such as "com.apple.hls.Interstitial", which can indicate that an interstitial is to be signaled.

In some embodiments, properties of the interstitial references can include an asset universal resource identifier (URI), a resume offset, a playout limit, a snap tag, a restrict tag, and/or any other suitable properties. In some embodiments, the asset URI can be a single URI. In some embodiments, the asset URI can be a list of multiple URIs that are ordered in a playback order, and are formatted in any suitable format (e.g., as a JSON object). In some embodiments, the resume offset property can indicate where along timeline 300 playback of the media content item will resume after the interstitial(s) have been played. In some embodiments, the playout limit property can specify a maximum duration for the interstitial to last. In some embodiments, the snap tag can indicate whether to seek segment boundaries of the media content item as timeline 300 transitions from the media content item to the interstitial, and vice-versa. In some embodiments, the restrict tag can be used to specify whether to enable or disable navigation through the interstitial (e.g., enable or disable skipping and/or seeking).

In some embodiments, placeholder segments 310 and/or 330 can include a single interstitial reference and can use the asset URI property (e.g., with multiple URIs) to transition timeline 300 to playback of multiple advertising content items. In some embodiments, placeholder segments 310 and/or 330 can include multiple interstitial references, and each interstitial reference can have the same duration. In some embodiments, for example when each interstitial reference within placeholder segments 310 and/or 330 are the same duration, each interstitial can reference a different asset URI inserted to transition timeline 300 to playback of a different advertising content item. In some embodiments, multiple individual interstitials can reference the same asset URI for playback of an advertising content item that has a duration longer than a single interstitial duration.

In some embodiments, any other suitable tag, reference, and/or other transition mechanisms for transitioning between types of content in a media content item timeline such as timeline 300 can be included in placeholder segments 310 and/or 330.

In some embodiments, placeholder segments 310 and 330 can be inserted into timeline 300 using any suitable mechanisms and/or processes. In some embodiments, placeholder segments 310 and/or 330 can be inserted into timeline 300 prior to start time 302.

Note that, although two advertisement breaks 306 and 326 are shown in FIG. 3, timeline 300 can include any suitable number of advertisement breaks in some embodiments. In some embodiments, any advertisement breaks not shown on timeline 300 can have placeholder segments associated with the advertisement break.

Turning to FIG. 4, an illustrative example of flow diagram of an illustrative process 400 for streaming media content items containing advertising content in accordance with some embodiments of the disclosed subject matter is shown. In some embodiments, process 400 can be executed on any suitable device, such as CDN server 102 and/or user devices 106 as discussed above in connection with FIG. 1.

In some embodiments, process 400 can start at block 402 when process 400 receives a manifest file as part of a request to stream a media content item. In some embodiments, at block 402, process 400 can receive any other suitable files, such as a media content item. For example, in some embodiments, process 400 can receive the media content item as a plurality of segments arranged in a playback order, where the plurality of segments can have any suitable duration and be encoded using any suitable video encoding format.

In some embodiments, process 400 can continue to block 404 when process 400 determines that the manifest file received at block 402 contains at least one reference to an advertising break. For example, in some embodiments, the manifest file and can be provided to process 400 through an advertising video-on-demand (AVOD) service and can include at least one advertising break (such as advertisement break 306 as described above in connection with FIG. 3) during playback of the media content item.

As a particular example, an episode of a situational comedy (sit-com) can typically have a duration of approximately 30 minutes, and the AVOD service can indicate (i.e., through an entry in the manifest file) that a first advertising break happens at a timestamp of 5:30 (five minutes and thirty seconds) into playback of the sit-com episode, and lasts for a duration of 30 seconds. The first advertising break can have any suitable duration, for example, 15 seconds, 30 seconds, 1 minute, and/or any suitable duration. Furthermore, the AVOD service can include additional entries in the manifest file that indicate a second advertising break happens at a timestamp of 14:02 (fourteen minutes and two seconds) into playback of the sit-com episode and lasts for a duration of 1 minute, and a third advertising break happens at a timestamp of 26:41 (twenty six minutes and forty one seconds) into playback of the sit-com episode and lasts for a duration of 15 seconds. In some embodiments, the manifest file can include any suitable quantity of advertising breaks, and each advertising break can have any suitable duration.

In some embodiments, process 400 can continue to block 406 where process 400 can insert a respective advertisement retrieval request (such as advertisement retrieval request(s) 304 and/or 324 as described above in connection with FIG. 3) into the manifest file for each advertisement break determined or identified at block 404. In some embodiments, the advertisement retrieval request can include any suitable information, such as the start time of the advertising break (relative to playback of the media content item), and a duration of advertising content required to fill the duration of the advertising break.

In some embodiments, the advertisement retrieval request can be inserted at a time before the advertising break, such as advertisement retrieval times 308 and/or 328. In some embodiments, the advertisement retrieval request can be placed before the advertising break such that any suitable mechanism or sub-process can retrieve advertising content during playback of the media content item, and can have the advertising content ready for playback by the time playback of the media content item has reached the advertising break. For example, in some embodiments, the advertisement retrieval request can be placed ahead of the advertising break far enough in order to allow an advertising auction to occur, and the winning advertisers to transfer their advertising content to the advertising server and/or server that is streaming the media content item. In some embodiments, any suitable mechanism can determine a timecode that can be included with the advertisement retrieval request, such that when streaming and/or playback of the media content item reaches that timecode, the advertisement retrieval request can be triggered and a request for advertising content can be sent to an advertising source.

In some embodiments, at block 408, process 400 can generate a quantity of placeholder segments that each have the same duration (e.g., 2 second, 5 seconds, 10 seconds), such as placeholder segments 310 and 330 as described above in connection with FIG. 3. In some embodiments, the quantity of placeholder segments can be determined based on the duration of each advertising break indicated in the manifest file. For example, if process 400 identifies an advertising break that has a duration of fifteen seconds, process 400 can generate three placeholder segments that each have a duration of five seconds, so that the total duration of the placeholder segments is fifteen seconds. In some embodiments, the placeholder segments can contain a discontinuity tag, indicating that the type of content before and after the end of the placeholder segment can be different, as described above in connection with placeholder segments 310 and 330.

In some embodiments, at block 408, process 400 can generate a quantity of placeholder segments that includes all the advertising breaks identified in the manifest file. In some embodiments, process 400 can determine a total duration of advertising breaks and can use that total duration to determine the quantity of placeholder segments required, where each placeholder segment has the same duration. For example, referencing the three advertising breaks described above at block 404, process 400 can determine that there is a total of 1 min and 45 seconds of advertising breaks across playback of the sit-com episode, and can generate twenty-one placeholder segments that have a duration of five seconds each, for a total placeholder segment duration of 1 min and 45 seconds.

In some embodiments, at block 410, process 400 can insert the quantity of placeholder segments into the media content item stream (e.g., the plurality of segments arranged in a playback order). In some embodiments, at block 410, process 400 can insert placeholder segments into the first advertising break identified. In some embodiments, at block 410, process 400 can insert placeholder segments into all the advertising breaks identified at block 404. In some embodiments, process 400 can use any suitable mechanism to perform the placeholder segment insertion.

In some embodiments, at block 412, process 400 can continue by streaming the media content item with the placeholder segments to a client device associated with the request received at block 402. In some embodiments, at block 412, process 400 can stream the media content item with the placeholder segments using any suitable media streaming protocol.

In some embodiments, at block 414, process 400 can receive a request to retrieve a first advertisement from an advertising server. In some embodiments, process 400 can receive the request at a time after the media content item has begun streaming to the client device. In some embodiments, at block 414, process 400 can receive the advertisement retrieval request that was inserted into the playback timeline at block 406. That is, in some embodiments, at block 414, streaming of the media content item can reach the designated timestamp for process 400 to retrieve advertising content, and process 400 can receive the request for retrieving advertising content.

In some embodiments, at block 416, process 400 can retrieve advertising content from any suitable source of advertising content. For example, in some embodiments, at block 416, process 400 can instruct an advertising content provider to hold an advertising auction, where several advertisers can place bids (manually or automatically) for their advertising content item(s) to be delivered to process 400 and ultimately to the client device that is streaming the media content item. In another example, in some embodiments, process 400 can retrieve advertising content item(s) that have already been designated for the current media content item (e.g., the current AVOD session). Note that, in some embodiments, process 400 can retrieve advertising content item(s) for a particular upcoming advertising break. That is, in some embodiments, process 400 can request advertising content item(s) that have a duration matching (or approximately matching) the upcoming advertising break. Additionally, the request for advertising content item(s) sent by process 400 at block 416 can be limited to requesting advertising content item(s) for an upcoming advertising break—that is, not for advertising content item(s) that can be used in advertising breaks across the entire playback of the media content item.

In some embodiments, at block 418, process 400 can store the advertising content item(s) in any suitable location. For example, in some embodiments, process 400 can store the retrieved advertising content item(s) in a cache of non-volatile or volatile memory.

In some embodiments, at block 420, process 400 can transition from streaming the media content item segments to streaming segment(s) of the advertising content item(s). In some embodiments, process 400 can use any suitable mechanism to stream the advertising content item(s). In some embodiments, process 400 can ensure that the advertising content item(s) are in any suitable storage location, such that information contained in the placeholder segments (e.g., pointers to a storage location) is accurate when streaming the advertising content item(s). In some embodiments, when the advertising content item(s) have completed, process 400 can transition from streaming the advertising content item(s) to resuming the stream of media content item segments at a playback location where the stream previously left off.

In some embodiments, process 400 can loop back at 422 to block 412. For example, in some embodiments, once a first advertisement break has been completed and process 400 has resumed streaming the media content item segments at block 412, process 400 can, at any suitable later time, receive a second advertisement retrieval request at block 414. Then, process 400 can retrieve new advertising content item(s) that fulfill any suitable criteria associated with the second advertisement retrieval request (e.g., duration of advertisements, content categories, particular products and/or brands, etc.). In some embodiments, when process 400 receives second advertising content item(s) at block 416 and stores them at block 418, process 400 can again transition the streaming from media content item segments to the second advertising item(s) at block 420.

Note that process 400 can loop at 422 for any suitable number of iterations. For example, process 400 can perform blocks 412-420 for each advertising break identified at block 404. In some embodiments, process 400 can determine that a user of the client device has navigated away from the playback mechanism used to stream the media content item(s), and process 400 can end before all the advertising breaks have been reached in playback of the media content item. In this way, process 400 can retrieve advertisements just prior to streaming the media content items, in accordance with some embodiments of the disclosed subject matter.

As described in association with FIG. 4 above, the blocks of process 400 are described consistent with dynamic or server-side advertisement insertion (DAI and SSAI, respectively) mechanisms found in streaming media technologies. In some embodiments, process 400 can alternatively be executed on a client device, consistent with client-side advertisement insertion mechanisms (CSAI).

Figure 5:
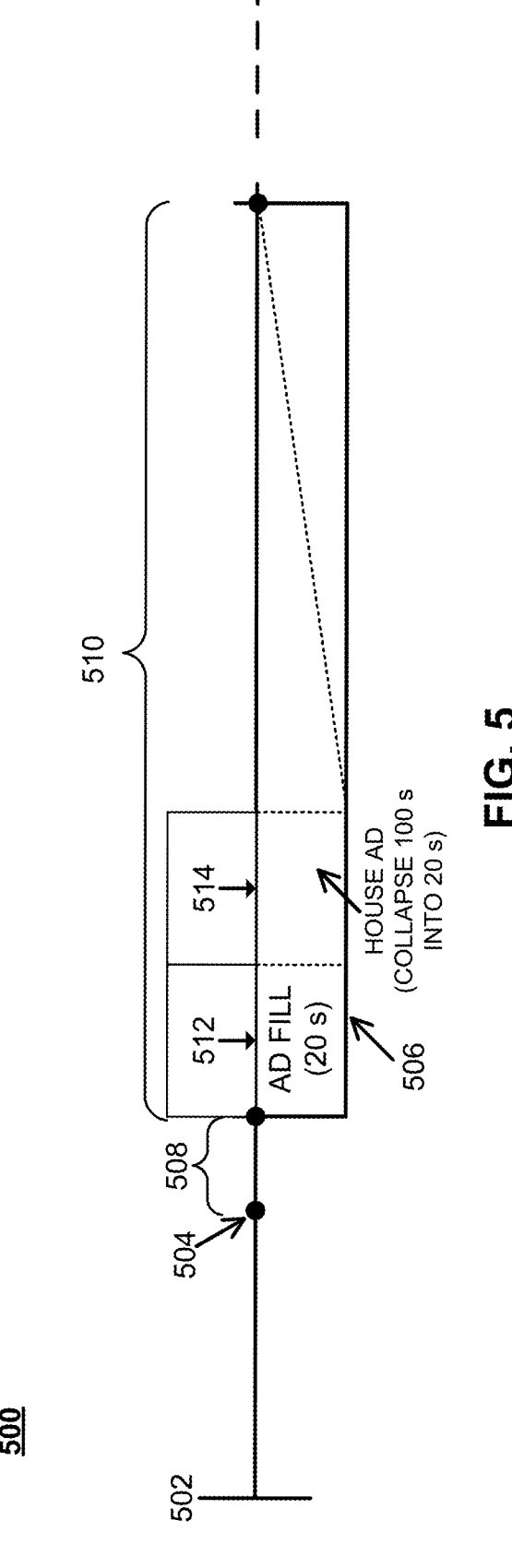
FIG. 5 is an illustrative example of a timeline for streaming media content items containing advertising content using the ad collapsing mechanisms described herein in accordance with some embodiments of the disclosed subject matter.

Turning to FIG. 5, an illustrative example of a timeline 500 for streaming a media content item with advertising content in accordance with some embodiments of the disclosed subject matter is shown. In some embodiments, timeline 500 can include a media content item start time 502, an advertisement retrieval request 504, an advertisement breaks 506, advertisement retrieval time 508, and advertisement fill 512 and one or more on-demand house advertisements 514 in advertisement pod or advertisement region 510.

In some embodiments, similar to FIG. 3, timeline 500 can represent a streaming media timeline. In some embodiments, timeline 500 can be included in any suitable manifest file using any suitable streaming media protocol, any suitable audio coding format, and any suitable video coding format. For example, timeline 500 can represent a media content item that is segmented for streaming to a client device according to mechanisms found in HTTP Live Streaming (HLS), Smooth Streaming, HTTP Dynamic Streaming (HDS), MPEG Dynamic Adaptive Streaming over HTTP (MPEG-DASH), and/or any other suitable streaming technique.

In some embodiments, the manifest file containing timeline 500 can be manipulated at a media content server (such as CDN server 102) prior to the start of streaming media content item segments to a client device. In some embodiments, the manifest file containing timeline 500 can be manipulated at the media content server during streaming of the media content item segments to the client device. For example, the manifest file containing timeline 500 can be manipulated at the media content server to include any suitable additional content, such as advertising content, placeholders for advertising content, etc. As a particular example, in some embodiments, a CDN server can modify the manifest file to include advertisement retrieval request 504, and advertisement retrieval time 508. That is, the manifest file can initially only contain references to the advertisement breaks 506, and any suitable mechanism (such as process 600 as described below in connection with FIG. 6) can modify and/or manipulate the manifest file to include additional items on timeline 500 (e.g., using a fetch-on-demand advertisement network).

Alternatively, in some embodiments, the manifest file containing timeline 500 can be manipulated at the client device. For example, in some embodiments, the manifest file can contain references to advertising breaks, and the client device can request advertising content from an advertising server. Continuing this example, in some embodiments, the client device can insert the advertising content received from an advertising server, such as a fetch-on-demand advertisement network, into timeline 500 of the manifest file.

In some embodiments, timeline 500 can include start time 502. In some embodiments, start time 502 can be the time when a server begins streaming segments of media content to a client device. In some embodiments, start time 502 can be the time when a client device receives any suitable content from a streaming server. In some embodiments, start time 502 can be the time when any suitable application, such as a media playback application, on the client device begins playback of streaming media content received from a streaming server.

In some embodiments, timeline 500 can include advertisement retrieval request 504. In some embodiments, timeline 500 can be modified (e.g., through manipulation of the manifest file) to include advertisement retrieval request 504. In some embodiments, advertisement retrieval request 504 can be inserted into timeline 500 at any suitable time. For example, in some embodiments, advertisement retrieval request 504 can be inserted into timeline 500 prior to start time 502, where start time 502 is a time when a streaming server (such as CDN 102 as described above in connection with FIG. 1) begins to send segments of a media content item to a client device. In another example, in some embodiments, advertisement retrieval request 504 can be inserted into timeline 500 after the start time 502, where start time 502 is a time when a streaming server (such as CDN 102 as described above in connection with FIG. 1) begins to send segments of a media content item to a client device. In a more particular example, advertisement retrieval request 504 can be inserted into timeline 500 based on an amount of time for playing back an entirety of a media content item (e.g., one 200 second advertisement pod for a media content item having a duration of 30 minutes, two 200 second advertisement pods for a media content item having a duration of one hour where the two advertisement pods are positioned within timeline 500 at 20 minutes and 40 minutes along the one-hour timeline, etc.).

In some embodiments, advertisement retrieval request 504 can include any suitable information. For example, advertisement retrieval request 504 can include a request for a server that is streaming the segments of a media content item to provide, request, and/or retrieve advertising content items. In some embodiments, advertisement retrieval request 504 can specify a particular advertisement server (such as advertisement server 103 as described above in connection with FIG. 1, a fetch-on-demand advertisement server, etc.) to use in the retrieval of advertising content, a duration of advertising content needed for an upcoming advertising break, any suitable information needed to personalize the advertising content to the user of the client device receiving the media stream, and/or any other suitable information.

In some embodiments, the location of advertisement retrieval request 504 on timeline 500 can be determined using any suitable mechanisms. For example, in some embodiments, advertisement retrieval requests 504 can be inserted into a manifest file at any suitable location on timeline 500 before an advertising break, such as before advertising break 506.

In some embodiments, any suitable mechanism can be used to determine advertisement retrieval time 508, where the advertisement retrieval time 508 can be a minimum amount of time required for a server such as CDN server 102 to retrieve advertising content, e.g., from advertisement server 103. In some embodiments, advertisement retrieval time 508 can have any suitable value, such as 1 second, 2 seconds, 5 seconds, and/or any other suitable value.

In some embodiments, any suitable mechanism can be used to determine and/or estimate advertisement retrieval time 508. For example, in some embodiments, a process such as process 500 as described in connection with FIG. 5 below can receive a manifest file containing timeline 500 and can identify advertising break 506. Continuing this example, in some embodiments, any suitable mechanism, such as process 500, can collect statistics on network traffic (e.g., available bandwidth, upload speeds, download speeds, etc.) between a server such as CDN 102 and a client device such as user devices 106, and/or between a server such as CDN 102 and service that provides advertising content, such as advertisement server 103.

In some embodiments, any other information can be used to determine advertisement retrieval time 508. For example, in some embodiments, advertisement server 103 can have an average time to complete an advertisement auction, which can be used to determine advertisement retrieval time 508. In some embodiments, any suitable mechanism can survey several advertisement server(s) 103 to find a particular advertisement server 103 that has the lowest average time to complete an advertisement auction, and the mechanisms can indicate (e.g., in advertisement retrieval request 504) that requests for advertising content are directed towards this particular advertisement server 103.

In some embodiments, any suitable mechanism can identify an advertisement server 103 that has any other properties, such as providing advertising content from certain brand(s), for certain product categories and/or service(s), and/or any suitable capabilities for personalizing advertising content based on any suitable input information (e.g., demographic information, location, viewing history and/or advertising profile information). In some embodiments, any suitable mechanisms can determine an estimated wait time for a given server (such as an advertisement server with properties as listed above) to provide advertising content once a request has been submitted.

In some embodiments, advertisement retrieval time 508 can be updated based on previous values of advertisement retrieval time(s) used for streaming a prior media content item from the same CDN server 102 to a client device.

In some embodiments, advertisement retrieval request 504 can be inserted into timeline 500 based upon advertisement retrieval time 508. For example, in some embodiments, any suitable mechanism (such as process 600) can be used to modify the manifest file to include advertisement retrieval request 504.

In some embodiments, advertisement breaks 506 can have any suitable duration. In some embodiments, advertisement break 506 can be listed in the manifest file using any suitable reference and/or notation, such as an advertisement marker. In some embodiments, advertisement break 506 can be associated with any suitable additional mechanisms and/or sub-processes, such as advertisement decisioning, advertisement insertion, and/or advertisement tracking. In some embodiments, advertisement break 506 can include a request for advertising content, which can be audio-visual content, audio-only content, video-only content, interactive content, and/or image content. In some embodiments, multiple advertising content items can be played during advertisement break 506. For example, advertisement break 506 can have a duration of 30 seconds and, based on any suitable decisioning made by an advertisement server that fulfills the request for ads associated with advertisement break 506, two 15 second clips can be played sequentially during advertisement break 506. In another example, advertisement break 506 can have a duration of 60 seconds and, based on any suitable decisioning made by an advertisement server that fulfills the request for ads associated with advertisement break 506, an ad fill that includes a 20 second advertisement can be played back followed by a 10 second house advertisement that was selected and retrieved from advertisement server 103. In turn, the remaining 30 seconds of the advertisement pod can be collapsed. Alternatively, additional advertisements can be selected and retrieved from advertisement server 103 in an on-demand basis to further collapse the remaining gap in the advertisement pod.

In some embodiments, advertisement break 506 can have any suitable duration such as 15 seconds, 30 seconds, 1 minute, 5 minutes, etc. In some embodiments, advertisement break 506 can be located at any suitable position on timeline 300.

Note that, although one advertisement break 506 is shown in FIG. 5, timeline 500 can include any suitable number of advertisement breaks in some embodiments. In some embodiments, any advertisement breaks not shown on timeline 500 can have an associated advertisement retrieval request prior to the advertisement break, with an associated advertisement retrieval time that can be used to determine where to place the associated advertisement retrieval request on timeline 500. Additionally, in some embodiments, each advertisement break can have the same duration or have different durations.

In some embodiments, any suitable additional properties can be associated with advertisement break 506. For example, in some embodiments, the manifest file can include a reference and/or property that requires advertisements to be shown according to durations set by advertisement break 506. As a particular example, a user can seek along timeline 500 to any suitable position of the playback of the media content item. In this particular example, if the user happens to seek from a position along timeline 500 before advertisement break 506 to a position along timeline 500 that is after advertisement break 506, advertisement break 506 can be adjusted to be played back immediately at the new timeline location, such that user receives the advertising content associated with advertisement break 506 prior to resuming streaming of the media content item at the timeline location. That is, in some embodiments, advertisement break 506 can be unskippable. In another particular example, the manifest file can include a property that requires particular types of house advertisements to be selected and retrieved for insertion to collapse a gap in an advertisement pod (e.g., show house advertisements that have been uploaded by a network source and processed by advertisement server 103 in which the house advertisements meet particular duration requirements, such as at least one advertisement that is between 30 seconds and 60 seconds in duration and at least one advertisement that is between 5 seconds and 10 seconds in duration, never show more than one house advertisement from a network source, etc.).

In some embodiments, advertisement break 506 can be skippable once advertising content has played for a subset of the duration of the advertising break. For example, in some embodiments, advertisement break 506 can be 5 minutes (300 seconds) long. Continuing this example, advertising break 506 can include instructions for a media player to display a user interface component after the advertisement fill has completed playback. Further continuing this example, a user interface signal can be received (e.g., at the server streaming the media content item) from the user interface component during the playback of a house advertisement of the advertisement break 506 that was selected and retrieved from a network source. Consequently, in this example and in some embodiments, advertising break 506 can end upon the receipt of the user interface signal during the playback of the house advertisement or after the completion of the house advertisement being played back.

In some embodiments, any suitable mechanisms can be used to collapse unfilled advertisement breaks, such as advertisement break 506. For example, in some embodiments, the mechanisms can determine a remaining amount of time corresponding to an unfilled portion of an advertising break. Based on the remaining amount of time corresponding to the unfilled portion of the advertising break, the mechanisms can, in turn, retrieve at least one advertisement content item for insertion in the unfilled portion of the advertising break, thereby resulting in a remaining portion of the advertising break, and collapsing the remaining portion of the advertising break to the end of the at least one advertising content item that was retrieved. This can, for example, condense the remaining amount of time in an unfilled portion of an advertising break with short form advertising content (e.g., advertising that is between five to ten seconds in length, advertising that is between ten to fifteen seconds in length, etc.). This can also, for example, promote continued engagement in the media content item, where the viewer can be presented with one or more shorter advertising content items instead of three hundred seconds worth of advertising content in an advertising break.

It should be noted that any suitable number of advertising content items can be selected and retrieved for insertion into the advertising break based on the remaining amount of time corresponding to the unfilled portion of the advertising break. For example, based on the remaining amount of time corresponding to the unfilled portion of the advertising break, a single advertising content item can be selected and retrieved for insertion into the advertising break. In another example, a single advertising content item can be selected and retrieved for insertion into the advertising break as long as the duration of the single advertising content item is less than the remaining amount of time corresponding to the unfilled portion of the advertising break. In yet another example, multiple advertising content items can be selected and retrieved for insertion into the advertising break, where each advertising content item has a duration that is less than a predetermined duration and where the total duration of the multiple advertising content items is less than the remaining amount of time corresponding to the unfilled portion of the advertising break. In a further example, multiple advertising content items can be selected and retrieved for insertion into the advertising break based on a predetermined number of advertising content items to be shown during the advertising break (e.g., where a macro, tag, or other value associated with the content stream or advertisement-related stream URL can indicate whether or not house advertisements are included, a maximum length of an advertising content item in seconds, a minimum length of an advertising content item in seconds, the number of advertisement slots to fill for an advertisement pod, a length of an advertisement pod in seconds, etc.).

In some embodiments, these mechanisms can receive a plurality of advertising content items from one or more network sources. For example, in order for an advertising content item to be eligible for selection and retrieval for insertion into an advertising break, the mechanisms can determine whether multiple advertising content items provided by a network source meets particular criterion. In continuing this example, the mechanisms can determine whether the network source has provided at least a first advertising content item having a first duration and at least a second advertising content item having a second duration and can determine whether the first duration associated with the first advertising content item is within a first range and whether the second duration associated with the second advertising content item is within a second range. In a more particular example, the mechanisms can determine whether at least a first advertising content item that is between 30 seconds and 60 seconds has been received from the network source and at least a second advertising content item that is between 5 seconds and 10 seconds has been received from the network source.

It should be noted that the advertising content items can be received using any suitable approach. For example, a network source can upload one or more advertising content items to a corresponding advertisement network, such as a fetch-on-demand advertisement network. In a more particular example, the mechanisms can provide a stream URL or any other suitable identifier of an on-demand video stream and the network source can upload one or more advertising content items in any suitable format, such as .mp4 format or .mov format. In another example, a network source can provide a URL or any other suitable link that points directly to the advertising content item. In response to receiving the advertising content items from the network source, the mechanisms can process these advertising content items (which are sometimes referred to as "house advertisements") and, upon completion of such processing, the mechanisms can add the processed advertising content items to a list of valid house advertisements for possible selection and retrieval for insertion into an advertising break. It should be noted that previously provided house advertisements can be processed at an expedited rate when adding the processed advertising content items to a list of valid house advertisements for possible selection and retrieval for insertion into an advertising break.

In some embodiments, in response to determining that the network source has provided at least a first advertising content item having a first duration and at least a second advertising content item having a second duration and in response to determining that the first duration associated with the first advertising content item is within a first range and that the second duration associated with the second advertising content item is within a second range, the mechanisms can determine whether the network source has assigned the advertising content items to a corresponding advertisement network, such as a fetch-on-demand advertisement network.

In some embodiments, the mechanisms can include a stream integrity feature that preserves user experience in viewing a video stream. For example, in response to determining that the duration criterion for advertising content items has not been met (e.g., that the first advertising content item is not within a first range, that the second duration associated with the second advertising content item is not within a second range, or that multiple advertising content items have been received), the mechanisms can execute a failsafe feature to preserve the user experience in viewing the video stream that can include selecting multiple advertisements to collapse a gap in an advertising break.

Turning to FIG. 6, an illustrative example of flow diagram of an illustrative process 600 for streaming media content items containing advertising content in accordance with some embodiments of the disclosed subject matter is shown. In some embodiments, process 600 can be executed on any suitable device, such as CDN server 102 and/or user devices 106 as discussed above in connection with FIG. 1.

In some embodiments, process 600 can start at block 602 when process 600 receives a manifest file as part of a request to stream a media content item. In some embodiments, at block 602, process 600 can receive any other suitable files, such as a media content item. For example, in some embodiments, process 600 can receive the media content item as a plurality of segments arranged in a playback order, where the plurality of segments can have any suitable duration and be encoded using any suitable video encoding format.

In some embodiments, process 600 can continue to block 604 when process 600 determines that the manifest file received at block 602 contains at least one reference to an advertising break. For example, in some embodiments, the manifest file and can be provided to process 600 through an advertising video-on-demand (AVOD) service and can include at least one advertising break (such as advertisement break 506 as described above in connection with FIG. 5) during playback of the media content item.

As a particular example, an episode of a situational comedy (sit-com) can typically have a duration of approximately 30 minutes, and the AVOD service can indicate (i.e., through an entry in the manifest file) that a first advertising break happens at a timestamp of 5:30 (five minutes and thirty seconds) into playback of the sit-com episode, and lasts for a duration of 30 seconds. The first advertising break can have any suitable duration, for example, 15 seconds, 30 seconds, 1 minute, and/or any suitable duration. Furthermore, the AVOD service can include additional entries in the manifest file that indicate a second advertising break happens at a timestamp of 14:02 (fourteen minutes and two seconds) into playback of the sit-com episode and lasts for a duration of 1 minute, and a third advertising break happens at a timestamp of 26:41 (twenty six minutes and forty one seconds) into playback of the sit-com episode and lasts for a duration of 15 seconds. In some embodiments, the manifest file can include any suitable quantity of advertising breaks, and each advertising break can have any suitable duration.

In some embodiments, process 600 can continue to block 606 where process 600 can insert a respective advertisement retrieval request (such as advertisement retrieval request 504 as described above in connection with FIG. 5) into the manifest file for each advertisement break determined or identified at block 604. In some embodiments, the advertisement retrieval request can include any suitable information, such as the start time of the advertising break (relative to playback of the media content item), a duration of advertising content required to fill the duration of the advertising break, a maximum length of an advertising content item in seconds, a minimum length of an advertising content item in seconds, the number of advertisement slots to fill for an advertisement pod, a length of an advertisement pod in seconds, etc.

In some embodiments, the advertisement retrieval request can be inserted at a time before the advertising break, such as advertisement retrieval time 508. In some embodiments, the advertisement retrieval request can be placed before the advertising break such that any suitable mechanism or sub-process can retrieve advertising content during playback of the media content item, and can have the advertising content ready for playback by the time playback of the media content item has reached the advertising break. For example, in some embodiments, the advertisement retrieval request can be placed ahead of the advertising break far enough in order to allow an advertising auction to occur, and the winning advertisers to transfer their advertising content to the advertising server and/or server that is streaming the media content item. In some embodiments, any suitable mechanism can determine a timecode that can be included with the advertisement retrieval request, such that when streaming and/or playback of the media content item reaches that timecode, the advertisement retrieval request can be triggered and a request for advertising content can be sent to an advertising source.

In some embodiments, at block 608, process 600 can continue by streaming the media content item to a client device associated with the request received at block 602. In some embodiments, at block 608, process 400 can stream the media content item using any suitable media streaming protocol.

In some embodiments, at block 610, process 600 can receive a request to retrieve a first advertisement from an advertising server. In some embodiments, process 600 can receive the request at a time after the media content item has begun streaming to the client device. In some embodiments, at block 610, process 600 can receive the advertisement retrieval request that was inserted into the playback timeline at block 606. That is, in some embodiments, at block 610, streaming of the media content item can reach the designated timestamp for process 600 to retrieve advertising content, and process 600 can receive the request for retrieving advertising content.

In some embodiments, at block 612, process 600 can retrieve advertising content from any suitable source of advertising content. For example, in some embodiments, at block 612, process 400 can instruct an advertising content provider to hold an advertising auction, where several advertisers can place bids (manually or automatically) for their advertising content item(s) to be delivered to process 600 and ultimately to the client device that is streaming the media content item. In another example, in some embodiments, process 600 can retrieve advertising content item(s) that have already been designated for the current media content item (e.g., the current AVOD session). Note that, in some embodiments, process 600 can retrieve advertising content item(s) for a particular upcoming advertising break. That is, in some embodiments, process 600 can request advertising content item(s) that have a duration matching (or approximately matching) the upcoming advertising break. Additionally, the request for advertising content item(s) sent by process 600 at block 610 can be limited to requesting advertising content item(s) for an upcoming advertising break—that is, not for advertising content item(s) that can be used in advertising breaks across the entire playback of the media content item.

In some embodiments, process 600 can continue to collapse unfilled advertisement breaks.

In some embodiments, at block 614, process 600 can determine a remaining amount of time corresponding to an unfilled portion of an advertising break. For example, referring back to FIG. 5, process 600 can determine that an advertisement fill in slot 512 has filled 20 seconds of a 300 second advertisement pod 510. It should be noted that the 20 second advertisement fill in slot 512 can include any suitable number of advertisements, such as two 10 second advertisements.

Based on the remaining amount of time corresponding to the unfilled portion of the advertising break at 614, process 600 can, at 616, retrieve at least one advertisement content item for insertion in the unfilled portion of the advertising break, thereby resulting in a remaining portion of the advertising break, and collapsing the remaining portion of the advertising break to the end of the at least one advertising content item that was retrieved at 618. This can, for example, condense the remaining amount of time in an unfilled portion of an advertising break with short form advertising content (e.g., advertising that is between five to ten seconds in length, advertising that is between ten to fifteen seconds in length, etc.). This can also, for example, promote continued engagement in the media content item, where the viewer can be presented with one or more shorter advertising content items instead of three hundred seconds worth of advertising content in an advertising break.

It should be noted that any suitable number of advertising content items can be selected and retrieved for insertion into the advertising break based on the remaining amount of time corresponding to the unfilled portion of the advertising break. For example, based on the remaining amount of time corresponding to the unfilled portion of the advertising break, a single advertising content item can be selected and retrieved for insertion into the advertising break. In another example, a single advertising content item can be selected and retrieved for insertion into the advertising break as long as the duration of the single advertising content item is less than the remaining amount of time corresponding to the unfilled portion of the advertising break. In yet another example, multiple advertising content items can be selected and retrieved for insertion into the advertising break by looping back at 620 to 614, where each advertising content item has a duration that is less than a predetermined duration and where the total duration of the multiple advertising content items is less than the remaining amount of time corresponding to the unfilled portion of the advertising break. In a further example, multiple advertising content items can be selected and retrieved for insertion into the advertising break based on a predetermined number of advertising content items to be shown during the advertising break (e.g., where a macro, tag, or other value associated with the content stream or advertisement-related stream URL can indicate whether or not house advertisements are included, a maximum length of an advertising content item in seconds, a minimum length of an advertising content item in seconds, the number of advertisement slots to fill for an advertisement pod, a length of an advertisement pod in seconds, etc.).

In some embodiments, a plurality of advertising content items can be received for possible insertion as on-demand house advertisements in an advertising pod from one or more network sources. For example, in order for an advertising content item to be eligible for selection and retrieval for insertion into an advertising break, process 600 can determine whether multiple advertising content items provided by a network source meets particular criterion. In continuing this example, process 600 can determine whether the network source has provided at least a first advertising content item having a first duration and at least a second advertising content item having a second duration and can determine whether the first duration associated with the first advertising content item is within a first range and whether the second duration associated with the second advertising content item is within a second range. In a more particular example, process 600 can determine whether at least a first advertising content item that is between 30 seconds and 60 seconds has been received from the network source and at least a second advertising content item that is between 5 seconds and 10 seconds has been received from the network source.

It should be noted that the advertising content items can be received using any suitable approach. For example, a network source can upload one or more advertising content items to a corresponding advertisement network, such as a fetch-on-demand advertisement network. In a more particular example, the mechanisms can provide a stream URL or any other suitable identifier of an on-demand video stream and the network source can upload one or more advertising content items in any suitable format, such as .mp4 format or .mov format. In another example, a network source can provide a URL or any other suitable link that points directly to the advertising content item. In response to receiving the advertising content items from the network source, process 600 can process these advertising content items (which are sometimes referred to as "house advertisements") and, upon completion of such processing, process 600 can add the processed advertising content items to a list of valid house advertisements for possible selection and retrieval for insertion into an advertising break. It should be noted that previously provided house advertisements can be processed at an expedited rate when adding the processed advertising content items to a list of valid house advertisements for possible selection and retrieval for insertion into an advertising break.

In some embodiments, in response to determining that the network source has provided at least a first advertising content item having a first duration and at least a second advertising content item having a second duration and in response to determining that the first duration associated with the first advertising content item is within a first range and that the second duration associated with the second advertising content item is within a second range, process 600 can determine whether the network source has assigned the advertising content items to a corresponding advertisement network, such as a fetch-on-demand advertisement network.

In some embodiments, process 600 can include a stream integrity feature that preserves user experience in viewing a video stream. For example, in response to determining that the duration criterion for advertising content items has not been met (e.g., that the first advertising content item is not within a first range, that the second duration associated with the second advertising content item is not within a second range, or that multiple advertising content items have been received), process 600 can execute a failsafe feature to preserve the user experience in viewing the video stream that can include selecting multiple advertisements to collapse a gap in an advertising break. In a more particular example, process 600 can loop back at 620 to determine one or more additional advertising content items that have been approved as house advertisements and that can fit within the remaining amount of time corresponding to the unfilled portion of the advertisement break.

Note that process 400 can loop at 620 for any suitable number of iterations. For example, process 600 can perform blocks 614 and 616 for each advertising break. In some embodiments, process 600 can determine that a user of the client device has navigated away from the playback mechanism used to stream the media content item(s), and process 600 can end before all the advertising breaks have been reached in playback of the media content item. In this way, process 600 can retrieve advertisements just prior to streaming the media content items, in accordance with some embodiments of the disclosed subject matter.

As described in association with FIG. 5 above, the blocks of process 600 are described consistent with dynamic or server-side advertisement insertion (DAI and SSAI, respectively) mechanisms found in streaming media technologies. In some embodiments, process 400 can alternatively be executed on a client device, consistent with client-side advertisement insertion mechanisms (CSAI).

It should be understood that at least some of the above-described blocks of processes 400 and 600 can be executed or performed in any order or sequence not limited to the order and sequence shown in and described in connection with FIGS. 4 and 6. Also, some of the above blocks of processes 400 and 600 can be executed or performed substantially simultaneously where appropriate or in parallel to reduce latency and processing times. Additionally or alternatively, some of the above described blocks of processes 400 and 600 can be omitted.

Accordingly, methods, systems, and media for streaming media content items containing advertising content are provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for inserting content into media content, the method comprising:

identifying, in a manifest file at a server used to stream media content items, at least one indication that at least one advertising content item is to be played back at a first playback position for a first duration when streaming a media content item;

determining a retrieval time to retrieve the at least one advertising content item from an advertising source for an advertisement break;

inserting, into the manifest file at the server used to stream media content items, a retrieval indication that the at least one advertising content item is to be retrieved from the advertising source at a second playback position;

retrieving the at least one advertising content item from the advertising source when streaming of the media content item has reached the second playback position;

determining a remaining amount of time corresponding to an unfilled portion of the advertisement break based on a duration of the at least one advertising content item;

based on the remaining amount of time corresponding to the unfilled portion of the advertising break, retrieving at least one additional advertisement content item for insertion in the unfilled portion of the advertising break, wherein the at least one additional advertisement content item is selected from a plurality of processed advertising content items received from a plurality of network sources, wherein each of the plurality of network sources has uploaded and assigned at least a first advertising content item having a first duration and at least a second advertising content item having a second duration, and wherein the first duration associated with the first advertising content item is determined to be within a first range and the second duration associated with the second advertising content item is determined to be within a second range; and collapsing the remaining portion of the advertising break to the end of the at least one additional advertising content item that was retrieved.

2. The method of claim 1, wherein retrieving at least one advertising content item from the advertising source when streaming of the media content item has reached the second playback position further comprises performing an advertising auction at the advertising source.

3. The method of claim 1, wherein the method further comprises generating a first quantity of placeholder segments and inserting the first quantity of placeholder segments into the media content item at the first playback position, and wherein each of the first quantity of placeholder segments is the second duration.

4. The method of claim 3, wherein a total duration across a sum of the first quantity of placeholder segments is equal to the first duration.

5. The method of claim 3, wherein a third duration of the at least one advertising content item is different than the total duration for the first quantity of placeholder segments.

6. The method of claim 3, wherein each of the first quantity of placeholder segments includes a discontinuity tag.

7. The method of claim 3, wherein the method further comprises:

storing the at least one advertising content item in a first memory location; and transitioning from streaming one of the plurality of streaming segments and one of the first quantity of placeholder segments to streaming the advertisement content item from the first memory location.

8. The method of claim 1, wherein the method further comprises determining whether to retrieve a plurality of additional advertisement content items for insertion in the unfilled portion of the advertising break based on the remaining amount of time corresponding to the unfilled portion of the advertising break.

9. The method of claim 1, wherein the method further comprises determining whether to retrieve a plurality of additional advertisement content items that have been designated as on-demand house advertisements from one or more of the plurality of network sources for insertion in the unfilled portion of the advertising break based on the remaining amount of time corresponding to the unfilled portion of the advertising break, wherein the on-demand house advertisements have been processed prior to receiving the manifest file.

10. A system for inserting content into media content, the system comprising:
  a hardware processor that:
    identifies, in a manifest file at a server used to stream media content items, at least one indication that at least one advertising content item is to be played back at a first playback position for a first duration when streaming a media content item;
    determines a retrieval time to retrieve the at least one advertising content item from an advertising source for an advertisement break;
    inserts, into the manifest file at the server used to stream media content items, a retrieval indication that the at least one advertising content item is to be retrieved from the advertising source at a second playback position;
    retrieves the at least one advertising content item from the advertising source when streaming of the media content item has reached the second playback position;
    determines a remaining amount of time corresponding to an unfilled portion of the advertisement break based on a duration of the at least one advertising content item;
    based on the remaining amount of time corresponding to the unfilled portion of the advertising break, retrieves at least one additional advertisement content item for insertion in the unfilled portion of the advertising break, wherein the at least one additional advertisement content item is selected from a plurality of processed advertising content items received from a plurality of network sources, wherein each of the plurality of network sources has uploaded and assigned at least a first advertising content item having a first duration and at least a second advertising content item having a second duration, and wherein the first duration associated with the first advertising content item is determined to be within a first range and the second duration associated with the second advertising content item is determined to be within a second range; and
    collapses the remaining portion of the advertising break to the end of the at least one additional advertising content item that was retrieved.

11. The system of claim 10, wherein retrieving at least one advertising content item from the advertising source when streaming of the media content item has reached the second playback position further comprises performing an advertising auction at the advertising source.

12. The system of claim 10, wherein the hardware processor is further configured to generate a first quantity of placeholder segments and insert the first quantity of placeholder segments into the media content item at the first playback position, and wherein each of the first quantity of placeholder segments is the second duration.

13. The system of claim 12, wherein a total duration across a sum of the first quantity of placeholder segments is equal to the first duration.

14. The system of claim 12, wherein a third duration of the at least one advertising content item is different than the total duration for the first quantity of placeholder segments.

15. The system of claim 12, wherein each of the first quantity of placeholder segments includes a discontinuity tag.

16. The system of claim 12, wherein the hardware processor is further configured to:
    store the at least one advertising content item in a first memory location; and
    transition from streaming one of the plurality of streaming segments and one of the first quantity of placeholder segments to streaming the advertisement content item from the first memory location.

17. The system of claim 10, wherein the hardware processor is further configured to determine whether to retrieve a plurality of additional advertisement content items for insertion in the unfilled portion of the advertising break based on the remaining amount of time corresponding to the unfilled portion of the advertising break.

18. The system of claim 10, wherein the hardware processor is further configured to determine whether to retrieve a plurality of additional advertisement content items that have been designated as on-demand house advertisements from one or more of the plurality of network sources for insertion in the unfilled portion of the advertising break based on the remaining amount of time corresponding to the unfilled portion of the advertising break, wherein the on-demand house advertisements have been processed prior to receiving the manifest file.

19. A non-transitory computer-readable medium containing computer-executable instructions that, when executed by a processor, cause the processor to perform a method for inserting content into media content, the method comprising:
    identifying, in a manifest file at a server used to stream media content items, at least one indication that at least one advertising content item is to be played back at a first playback position for a first duration when streaming a media content item;
    determining a retrieval time to retrieve the at least one advertising content item from an advertising source for an advertisement break;
    inserting, into the manifest file at the server used to stream media content items, a retrieval indication that the at least one advertising content item is to be retrieved from the advertising source at a second playback position;
    retrieving the at least one advertising content item from the advertising source when streaming of the media content item has reached the second playback position;
    determining a remaining amount of time corresponding to an unfilled portion of the advertisement break based on a duration of the at least one advertising content item;
    based on the remaining amount of time corresponding to the unfilled portion of the advertising break, retrieving at least one additional advertisement content item for insertion in the unfilled portion of the advertising break, wherein the at least one additional advertisement content item is selected from a plurality of processed advertising content items received from a plurality of network sources, wherein each of the plurality of network sources has uploaded and assigned at least a first advertising content item having a first duration and at least a second advertising content item having a second duration, and wherein the first duration associated with the first advertising content item is determined to be within a first range and the second duration associated with the second advertising content item is determined to be within a second range; and collapsing the remaining portion of the advertising break to the end of the at least one additional advertising content item that was retrieved.

\* \* \* \* \*